(12) United States Patent
Burr et al.

(10) Patent No.: US 7,756,984 B2
(45) Date of Patent: Jul. 13, 2010

(54) SYSTEMS AND METHODS FOR VIRTUAL HOST NAME ROAMING

(75) Inventors: Michael Burr, Redmond, WA (US); Min-Chih Lu Earl, Redmond, WA (US); Anatoliy Panasyuk, Bellevue, WA (US); Abolfazl Sirjani, Kirkland, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 852 days.

(21) Appl. No.: 10/711,591

(22) Filed: Sep. 27, 2004

(65) Prior Publication Data

US 2006/0075080 A1    Apr. 6, 2006

Related U.S. Application Data

(62) Division of application No. 10/711,583, filed on Sep. 27, 2004.

(51) Int. Cl.
G06F 15/16 (2006.01)
(52) U.S. Cl. ..................................................... 709/228
(58) Field of Classification Search ................. 709/250, 709/223, 228, 227
See application file for complete search history.

(56) References Cited

U.S. PATENT DOCUMENTS

| | | | | |
|---|---|---|---|---|
| 5,878,212 A | * | 3/1999 | Civanlar et al. | 709/203 |
| 6,041,353 A | * | 3/2000 | Hirata et al. | 709/224 |
| 6,115,545 A | * | 9/2000 | Mellquist | 709/220 |
| 6,195,689 B1 | * | 2/2001 | Bahlmann | 709/217 |
| 6,725,303 B1 | * | 4/2004 | Hoguta et al. | 710/106 |
| 6,728,767 B1 | * | 4/2004 | Day et al. | 709/223 |
| 6,801,528 B2 | * | 10/2004 | Nassar | 370/389 |
| 6,856,676 B1 | * | 2/2005 | Pirot et al. | 379/201.01 |
| 6,959,341 B1 | * | 10/2005 | Leung | 709/250 |

(Continued)

OTHER PUBLICATIONS

VelocityReviews; "Assign static address to a VPN user (from IOS router)"; Nov. 3, 2003; forum post at www.VelocityReviews.com; pp. 1-5; http://www.velocityreviews.com/forums/t29840-assign-static-address-to-a-vpn-user-from-ios-router.html retrieved Sep. 30, 2008.*

(Continued)

Primary Examiner—Asad M Nawaz
Assistant Examiner—Jeffrey Nickerson
(74) Attorney, Agent, or Firm—Choate, Hall & Stewart, LLP

(57) ABSTRACT

Systems and methods for providing a uniform network addressing scheme for a user accessing a network that is independent from the computer from which the user accesses the network. A virtual IP address is assigned to a user, a user session or a program run by user, where the IP address is different from the IP address of the computer of the user, and different from other users. A virtual host name is assigned to and associated with the virtual IP address of the user, user session or the program the user is running. As the user accesses the network from different computers, the user can be assigned the same virtual host name and in some cases the same virtual IP address. Furthermore, as the user accesses the network from multiple user sessions, the user can be assigned a virtual host name that uniquely identifies the user and the user session.

19 Claims, 11 Drawing Sheets

U.S. PATENT DOCUMENTS

| | | | | |
|---|---|---|---|---|
| 6,976,258 | B1* | 12/2005 | Goyal et al. | 718/104 |
| 7,003,574 | B1* | 2/2006 | Bahl | 709/228 |
| 7,146,431 | B2* | 12/2006 | Hipp et al. | 709/238 |
| 7,210,147 | B1* | 4/2007 | Hipp et al. | 719/312 |
| 7,353,280 | B2* | 4/2008 | Chiles et al. | 709/228 |
| 7,363,376 | B2* | 4/2008 | Uhlik et al. | 709/227 |
| 7,366,188 | B2* | 4/2008 | Kim | 370/401 |
| 7,483,992 | B2* | 1/2009 | Bahl | 709/228 |
| 7,536,463 | B2* | 5/2009 | Seo | 709/227 |
| 2003/0028649 | A1* | 2/2003 | Uhlik et al. | 709/228 |
| 2003/0051021 | A1* | 3/2003 | Hirschfeld et al. | 709/223 |
| 2003/0158960 | A1* | 8/2003 | Engberg | 709/237 |
| 2003/0188195 | A1* | 10/2003 | Abdo et al. | 713/201 |
| 2003/0200321 | A1* | 10/2003 | Chen et al. | 709/229 |
| 2003/0208602 | A1* | 11/2003 | Bhalla et al. | 709/227 |
| 2004/0267866 | A1* | 12/2004 | Carollo et al. | 709/200 |
| 2005/0108407 | A1* | 5/2005 | Johnson et al. | 709/228 |
| 2005/0198306 | A1* | 9/2005 | Palojarvi et al. | 709/227 |
| 2006/0045089 | A1* | 3/2006 | Bacher et al. | 370/392 |

OTHER PUBLICATIONS

ISA01; "Common DNS Issues in VPN Networking"; www.isaserver. org; pp. 1-50; http://www.isaserver.org/img/upl/vpnkitbeta2/dnsvpn. htm retrieved Sep. 29, 2008.*

LinuxQuestions; "Multiple Simultaneous VPN connections?"; Aug. 29, 2002; forum post at www.linuxquestions.org; pp. 1-4; https://www.linuxquestions.org/questions/linux-networking-3/multiple-simultaneous-vpn-connections-28969/ retrieved Sep. 29, 2008.*

Microsoft01; "Remote Access VPN Connections"; www.microsoft. com; pp. 1-4; http://www.microsoft.com/technet/prodtechnol/windows2000serv/reskit/intwork/inbe_vpn_obwd.mspx?mfr=true retrieved Sep. 29, 2008.*

Shinder, Thomas; "Common DNS Issues in VPN Networking"; excerpt from "The ISA Server 2000 VPN Deployment Kit"; Apr. 7, 2004.*

Microsoft Corporation; "Remote Access VPN Connections"; excerpt from the "Microsoft Windows 2000 Server Resource Kit"; Jan. 19, 2000.*

Microsoft02; excerpts from: Microsoft Corporation; "Microsoft Windows 2000 Server Resource Kit: Internetworking Guide"; Jan. 19, 2000; pp. 1-58.*

* cited by examiner

SYSTEMS AND METHODS FOR VIRTUAL HOST NAME ROAMING

CROSS REFERENCE TO RELATED APPLICATIONS

This present application is a divisional of and claims priority to U.S. Pat. No. 10/711,583, entitled "SYSTEM AND METHOD FOR MANAGING VIRTUAL IP ADDRESSES" and filed Sep. 27, 2004, which is incorporated herein by reference.

TECHNICAL FIELD

The invention generally relates to network communications. More particularly, the invention relates to systems and methods for providing a uniform network addressing scheme to assign virtual host names to a user accessing a network.

BACKGROUND INFORMATION

A typical computer system uses a single internet protocol (IP) address and corresponding host name assigned to the computer system. Any user session or program on the computer will use the host name of the computer for network communications, such as on a TCP/IP network. Communications over the network to and from the computer, for example between a client and a server, use the computers host name and IP address as part of the network communications of the computer. Even in a multi-user environment such as a server using Microsoft Terminal Server, all users or programs running on the multi-user server will share the same host name and IP address assigned to that server. The IP address and host name is computer or machine dependent and are associated with network communications originating from the computer. Even in the case where a computer has multiple network cards and multiple IP addresses, these IP addresses and their host names are associated with the computer and not specifically with users or programs of the computer. All users and programs on the computer will communicate over a network with the host name of the computer. As such, the host name is associated with the computer and not the user of the computer.

In performing host name resolution on a network or to look up host names used on a network, only the host names and IP addresses of computers in the network will be found. From these host names, the user or user session on the computer may not be easily identified. Furthermore, a user may be accessing the network from different computers each with a different host name or from multiple user sessions on the same computer with the same host name. As such, the typical network addressing scheme does not allow for efficient lookup of a user by host name to determine what users may be accessing the network and from how many sessions or from what computers.

Additionally, some applications assume that each user or program will use a unique host name. For example, some network monitoring and mainframe systems use the host name to identify users. However, if two users are on the same computer they will share the same host name assigned to the computer. In another case, the user may roam within a server farm and therefore does not always access the network from the same computer. For example, some multi-user systems use a set of load balancing servers to support a large number of concurrent users. When a user connects, the user is automatically and dynamically directed to the least loaded server to balance the load. Unfortunately, this means the IP address and host name of the computer the user is assigned to is not known until the user is connected to the dynamically determined server. This makes it more difficult to associate a host name or IP address with a user.

Thus, it is desirable to provide a uniform network addressing scheme for a user roaming on a network, accessing a multi-user system, or starting multiple user sessions. Systems and methods are needed for assigning virtual host names to virtual IP addresses for users that are independent from the IP address and host name of the computer system from which the user accesses a network.

SUMMARY OF THE INVENTION

The present invention relates to systems and methods for providing a uniform network addressing scheme to assign a virtual host name to a user or user session as the user roams a network or starts up multiple sessions. The present invention provides a program, user or user session with a unique virtual internet protocol (IP) address different than the one assigned to the computer for communicating over a network. As such, multiple users on the same computer can perform network communications with unique IP addresses different from each other and the computer. Furthermore, a virtual host name or set of virtual host names can be associated with a particular user, and can be associated with the user regardless of the virtual IP address that may be assigned to the user or program of the user. The present invention then associates the virtual host name with the virtual IP address of the user so that the virtual host name identifies the user in a uniform fashion. In summary, the present invention provides for a virtual host name to be associated with a user that is independent from the host name of the computer and that roams with the user through the network.

In one aspect, the invention relates to a method for providing a uniform network addressing scheme for a user accessing a computer on a network independent from the computer the user is accessing. The method comprises the step of obtaining a plurality of virtual host names, and the step of assigning, from the plurality of virtual host names, a first virtual host name to a first user accessing a first computer via the network and obtaining a second virtual host name, different from the first virtual host name, to a second user accessing the first computer via the network. The method further comprises associating the first virtual host name of the first user with an internet protocol address of the first user associated with the first computer and associating the second virtual host name of the second user with an internet protocol address of the second user associated with the first computer.

In one embodiment, the method further comprises the step of obtaining a plurality of internet protocol addresses for assigning unique internet protocol addresses to each of the users. In another embodiment, the method further comprises obtaining at least one of the plurality of internet protocol addresses from a Dynamic Host Configuration Protocol server. The method may also include reserving at least one of the plurality of internet protocol addresses for at least one of the first user and the second user. In a further embodiment, the method comprises associating the least one reserved internet protocol address with the first virtual host name or the second virtual host name.

In one embodiment, the method further comprises assigning, from the plurality of internet protocol addresses, a first internet protocol address to the first user, and a second internet protocol address, different from the first internet protocol address, to the second user. In another embodiment, the method further comprises registering, with a name resolution service, at least one of the plurality of virtual host names to at least one of the first user and the second user. In one embodiment, the name resolution service comprises a Domain Name Service, and in another embodiment, it may comprise a Windows Internet Naming Service.

In an embodiment of the method, the method further comprises assigning the first virtual host name to the first user accessing a second computer and associating the first virtual host name with an internet protocol address of the second computer associated with the first user.

In another embodiment, the method further comprises assigning the second virtual host name to the second user accessing a second computer and associating the second virtual host name with an internet protocol address of the second computer associated with the second user. The method may also includes assigning, while the first user accesses the first computer, a third virtual host name to the first user accessing a second computer and associating the third virtual host name with an internet protocol address of the second computer associated with the first user.

In another embodiment, the method assigns, while the second user accesses the first computer, a fourth virtual host name to the second user accessing a second computer and associates the fourth virtual host name with an internet protocol address of the second computer associated with the second user.

In one embodiment, the method may include naming one or more of the virtual host names with a portion of the characters representing the user's identity on the network. In another embodiment, the method may name at least one of the virtual host names with a suffix identifying the session of the user when the user is concurrently accessing multiple computers on the network.

In another aspect, the present invention relates to a system for providing a uniform network addressing scheme for a user accessing a computer on a network independent from the computer the user is accessing. The system comprises a server on a network providing a one or more virtual host names and a first computer having a network interface. The first computer on the network obtains a first virtual host name from the one or more virtual host names for a first user of the first computer and a second virtual host name, different from the first virtual host name, for a second user of the first computer. The network interface of the first computer associates the first virtual host name of the first user with an internet protocol address of the first computer associated with the first user, and associates the second virtual host name of the second user with an internet protocol address of the first computer associated with the second user.

In one embodiment of the system, the server obtains a plurality of internet protocol addresses for assigning a unique internet protocol address to each of the users. The server may obtain at least one of the internet protocol addresses from a Dynamic Host Configuration Protocol server. In a further embodiment, the server reserves at least one of the internet protocol addresses for at least one of the users.

In another embodiment, the server assigns, from the internet protocol addresses, a first internet protocol address for the first user, and a second internet protocol address, different from the first internet protocol address, for the second user. In one embodiment, the network interface associates the least one reserved internet protocol address with at least one of the first virtual host name and the second virtual host name. In one embodiment, the system further comprises a name resolution service to register at least one of the plurality of virtual host names to at least one of the users. The name resolution service may comprise a Domain Name Service or a Windows Internet Naming Service.

In another system embodiment, the network interface assigns the first virtual host name to the first user accessing a second computer and associates the first virtual host name with an internet protocol address of the second computer associated with the first user. In a further embodiment, the network interface assigns the second virtual host name to the second user accessing a second computer and associates the second virtual host name with an internet protocol address of the second computer associated with the second user. In yet another embodiment, a network interface of a second computer assigns, while the first user accesses the first computer, a third virtual host name to the first user accessing the second computer and associates the third virtual host name with an internet protocol address of the second computer associated with the first user. Also the system may include the network interface of the second computer assigns, while the second user accesses the first computer, a fourth virtual host name to the second user accessing the second computer and associates the fourth virtual host name with an internet protocol address of the second computer associated with the second user.

In one embodiment of the system, the name of at least one of the virtual host names comprises a portion of the characters representing the user's identity on the network. In another system embodiment, the name of the least one of the virtual host names comprises a suffix identifying the session of the user when the user is concurrently accessing multiple computers on the network.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made expressly herein, without departing from the spirit and scope of the invention.

The illustrative embodiments of the present invention provide for assigning unique network identifiers for network communications of one or more programs, users or user sessions running on a computer. The present invention also provides for assigning unique loopback addresses to one or more programs, users or user sessions for inter-process communications using the loopback interface of a computer. Furthermore, certain embodiments of the present invention provide for a uniform addressing scheme to provide one or more programs, users or users sessions a host name and/or internet protocol address that is associated with a user as the user moves from one computer to the next on the network or starts up multiple user session.

Figure 1A:
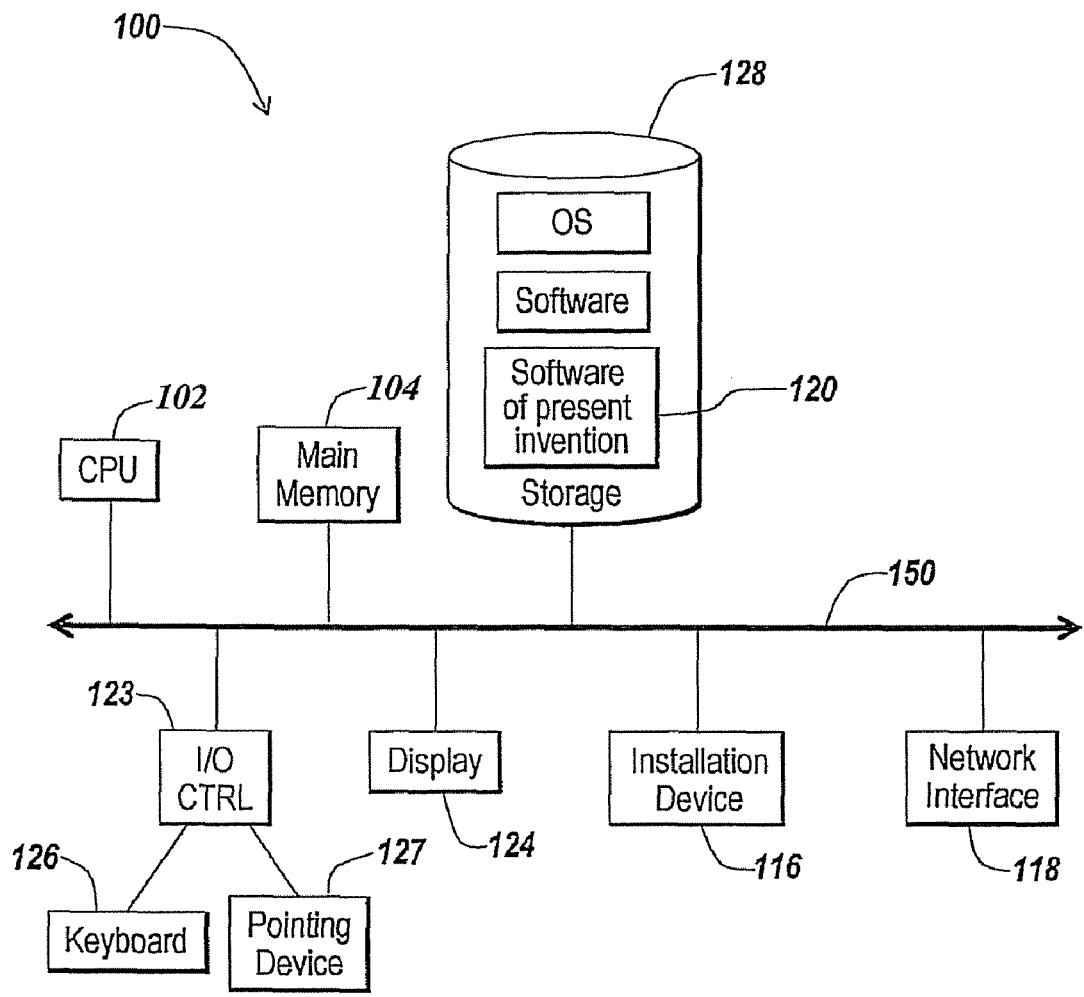
FIGS. 1A and 1B are block diagrams of embodiments of a computing device for practicing an embodiment of the present invention.
Figure 1B:
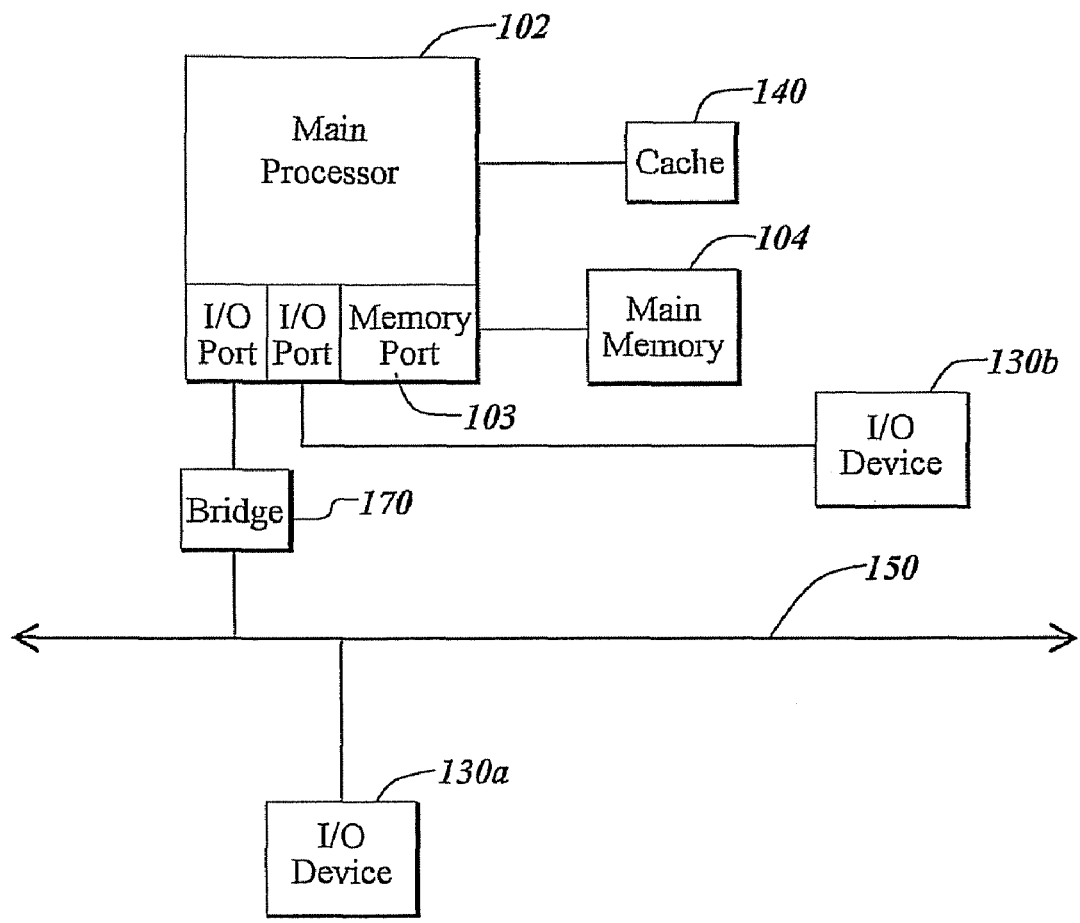

FIGS. 1A and 1B depict block diagrams of a computing device 100 useful for practicing an embodiment of the present invention. As shown in FIGS. 1A and 1B, each computing device 100 includes a central processing unit 102, and a main memory unit 104. As shown in FIG. 1A, a typical computing device may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, or the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif. The computer 100 may be based on any of the above described processors, or any other available processors capable of operating as described herein.

Main memory unit 104 may be one or more memory chips capable of storing data and allowing any storage location to be directly accessed by the microprocessor 102, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 104 may be based on any of the above described memory chips, or any other available memory chips capable of operating as described herein. In the embodiment shown in FIG. 1B, the processor 102 communicates with main memory 104 via a system bus 150 (described in more detail below). FIG. 1B depicts an embodiment of a computer 100 in which the processor communicates directly with main memory 104 via a memory port 103. For example, in FIG. 1B the main memory 104 may be DRDRAM.

FIGS. 1A and 1B depict embodiments in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 104 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as software related to the present invention 120.

The computing device 100 may further comprise a storage device 128, such as one or more hard disk drives or redundant arrays of independent disks, for storing an operating system and other related software, and for storing application software programs such as any program 120 related to the present invention. Optionally, any of the installation devices 116 could also be used as the storage device 128. Additionally, the operating system and software programs 120 of the present invention can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by a an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 118 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, Java or Unix, among others.

In other embodiments, the computing device 100 may have different processors, operating systems, and input devices consistent with the device. For example, in one embodiment the computer 100 is a Zire 71 personal digital assistant manufactured by Palm, Inc. In this embodiment, the Zire 71 operated under the control of the PalmOS operating system and includes a stylus input device as well as a five-way navigator device. Moreover, the computing device 100 can be any computer, workstation, desktop computer, laptop or notebook computer, server, handheld computer, mobile telephone, or other form of computing or telecommunications device that is capable of communication and that has sufficient processor power and memory capacity to perform the operations described herein.

Figure 2:
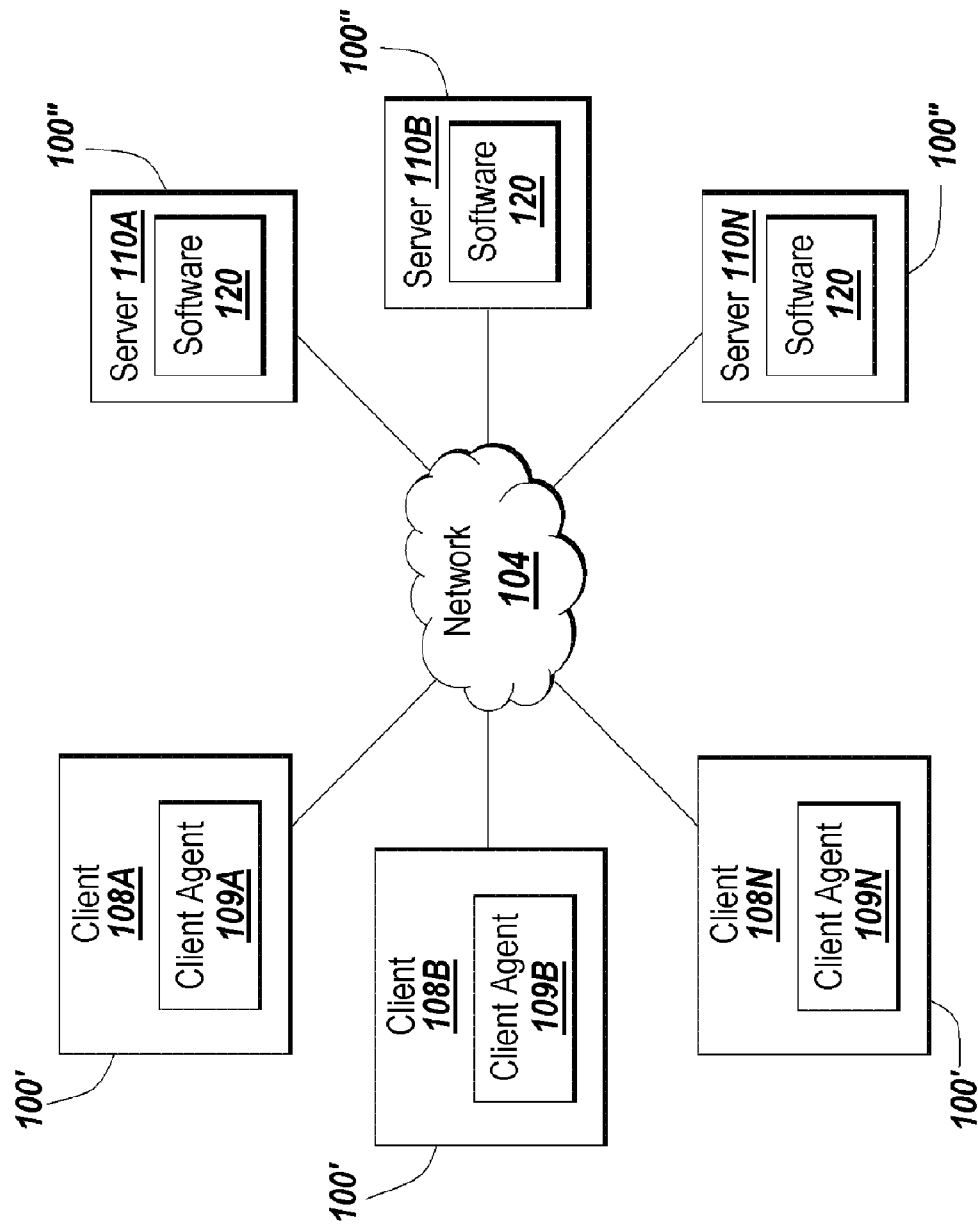
FIG. 2 is a block diagram of a client-server computer system for practicing an illustrative embodiment of the present invention.

Referring to FIG. 2, in general, the present invention pertains to client-server systems and network communications. In brief overview, one embodiment of a client-server system 102 in which the present invention may be used is depicted. A client node 108a communicates with a server node 110a over a communications network 104. The system 102 may have one or more client nodes 108a-108n, each communicating to one or more server nodes 110a-110n over the network 104. The topology of the network 104 over which the client nodes 108a-108n communicate with one or more server nodes, 110a-110n may be a bus, star, or ring network topology. The network 104 can be a local area network (LAN), a metropolitan area network (MAN), or a wide area network (WAN) such as the Internet. The network 104 and network topology may be of any such network or network topology capable of supporting the operations of the present invention described herein.

The client and server nodes 108a-108n, 110a-110n can connect to the network 104 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), and wireless connections. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

In one embodiment (now shown), the network 104 is separated into networks 104 and 104'. The networks 104 and 104' can be the same type of network or different types of networks. In one embodiment, the network 104 and/or the network 104' is, for example, a local-area network (LAN), such as a company Intranet, or a wide area network (WAN), such as the Internet or the World Wide Web. The clients 108a-108n and the server 10118a-118n can be connected to the networks 104 and/or 104' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

The client nodes, or clients, 108a-108n may be any workstation, desktop computer, laptop, handheld computer, mobile telephone, or other computing device 100 capable of communication and that has sufficient processor power and memory capacity to perform the operations described herein. Additionally, the client 108a-108n can be a local desktop client on a local network 104 or can be a remote display client of a separate network 104'. The client 108a-108n can include, for example, a visual display device (e.g., a computer monitor), a data entry device (e.g., a keyboard), persistent and/or volatile storage (e.g., computer memory), a processor, and a pointing device, such as a mouse. In a similar manner, the server nodes, or servers, 110a-110n may be any type of computing device 100 capable of operating as described herein. Furthermore, the server nodes 110a-110n may be provided as a group of server systems logically acting as a single server system, referred to herein as a server farm. In one embodiment, the server node 110a-110n is a multi-user server system supporting multiple concurrently active client connections or user sessions.

In some embodiments, as shown in FIG. 2, a client agent 109a-109n is included within the client 108a-108n. The client agent 109a-109n can be, for example, implemented as a software program and/or as a hardware device, such as, for example, an ASIC or an FPGA. An example of a client agent 109a-109n with a user interface is a Web Browser (e.g. a Microsoft® Internet Explorer browser and/or Netscape™ browser). The client agent 109a-109n can use any type of protocol and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Protocol (RDP) client agent from Microsoft Corporation of Redmond, Wash. In some embodiments (not shown), the client 108a-108n includes a plurality of client agents 109a-109n, each of which may communicate with a server 110a-110n, respectively.

In any of the clients 108a-108n and servers 110a-110n, the computers (100, 100', etc) typically run a single copy of the operating system for operating the computer 100. The operating system provides software and resources such as those necessary for the computer 100 to communicate on a network 104 over a network interface 118. A most widely used standard for network communications is the Transmission Control Protocol/Internet Protocol (TCP/IP), which is a combined set of protocols that performs the transfer of data between computers 100 on a network 104. The TCP protocol monitors and ensures correct transfer of data. The IP protocol uses an internet protocol address or IP address, which is a numerical address to uniquely identify computers 100 on a network 104 to route network traffic and establish connections among computers 100 on the network 104. A more user-friendly domain name, or computer host name, comprising a string of characters can be associated with the IP address to uniquely identify the computer. A computer 100 may have more than one domain name or IP address but a given domain name or IP address points to only one computer 100 on a network 104.

With many operating systems capable of running on the computer 100, such as Microsoft WINDOWS, Linux or a UNIX operating system, there is a single network and TCP/IP protocol layer, or TCP stack, for performing network communications. The IP address and domain name assignment to a computer is device dependent. That is, the network identifier, such as an IP address and/or domain name, is assigned to the computer 100 to associate and identify any network communications from the computer 100. Any user, application, user session or any other program that may run on the computer 100 that causes network communications uses the computer assigned network identifier. As such, a user of a computer or a program running on a computer communicates over the network using a network identifier assigned to the computer. For example, a computer 100 is assigned an IP address of 192.168.1.100. A first user logs into the computer and runs a program that generates network traffic over the network 104. The IP address of 192.168.1.100 will be used as part of the TCP/IP protocol related network communications to uniquely identify the network to and from the computer 100. A second user logs into the computer 100 and runs another program that also generates network traffic over the network 104. The same IP address of 192.168.1.100 will be used in the network communications of the second user. As such, the user who generates the network traffic can not be distinguished by the IP address of their respective network communications.

In the case of a multi-user computer, such as a server running Microsoft Terminal Server, multiple users can log into the server and run programs concurrently or simultaneously. Since the server is running a single operating system and has an IP address assigned to the server, the multiple users and the multiple programs run by the users all share the same IP address. Each user session hosted by the server share the same IP address. Even in the case where a computer has multiple network interface cards (118, 118', etc.), such as a server 110 running multiple ftp or web-sites, and having one or more IP addresses assigned to each network interface card 118, the IP address is still machine dependent. The one or more IP addresses identify the server and not the user or programs communicating on the server 110.

Many applications require each user or program to have separate IP addresses in order to work. Yet other applications use the IP address or host name to identify the user. Additionally, network monitoring applications and systems can monitor network activity such as internet activity and other application activity. However, if each user or application is using the same IP address, the monitoring application cannot identify the user associated with the activity. The present invention provides the advantage of assigning unique network identifiers to each of multiple programs or users communicating on the network 104 from the same computer 100.

Figure 3A:
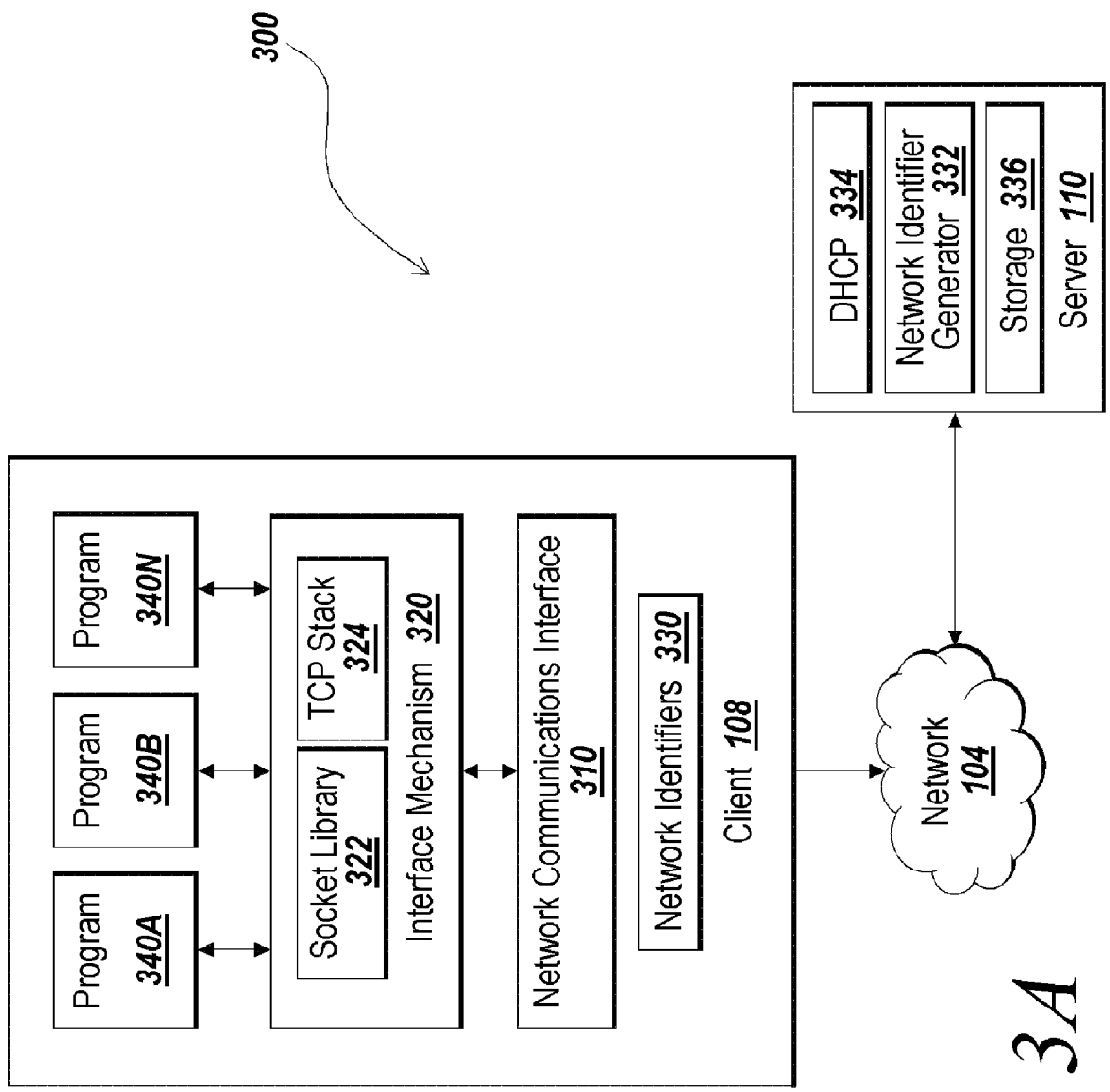
FIG. 3A is a block diagram of an embodiment of the present invention for assigning unique network identifiers in a client node in a network.
Figure 3B:
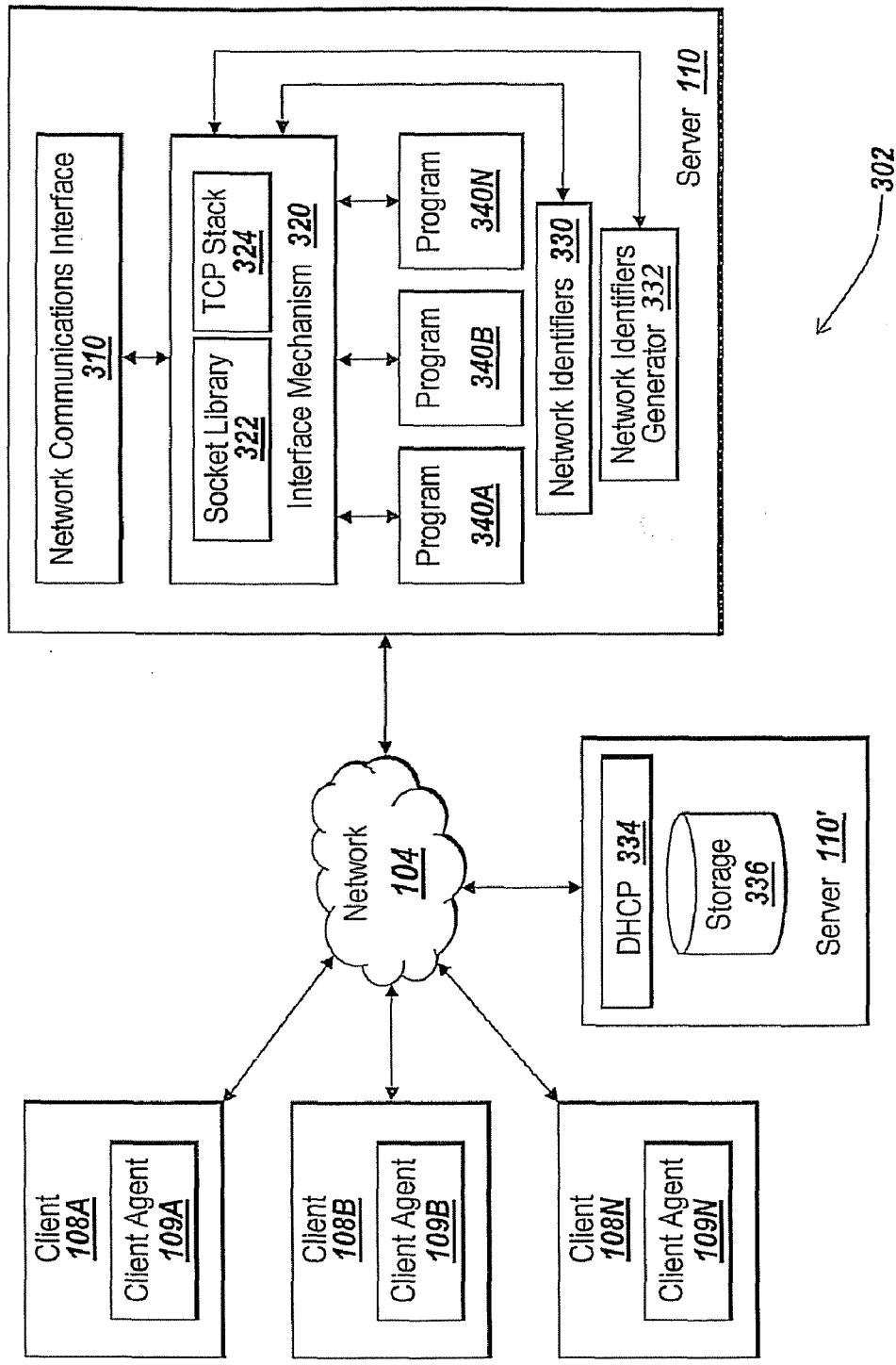
FIG. 3B is a block diagram of an embodiment of the present invention for assigning unique network identifiers in a server node of a client-server computer system.
Figure 3C:
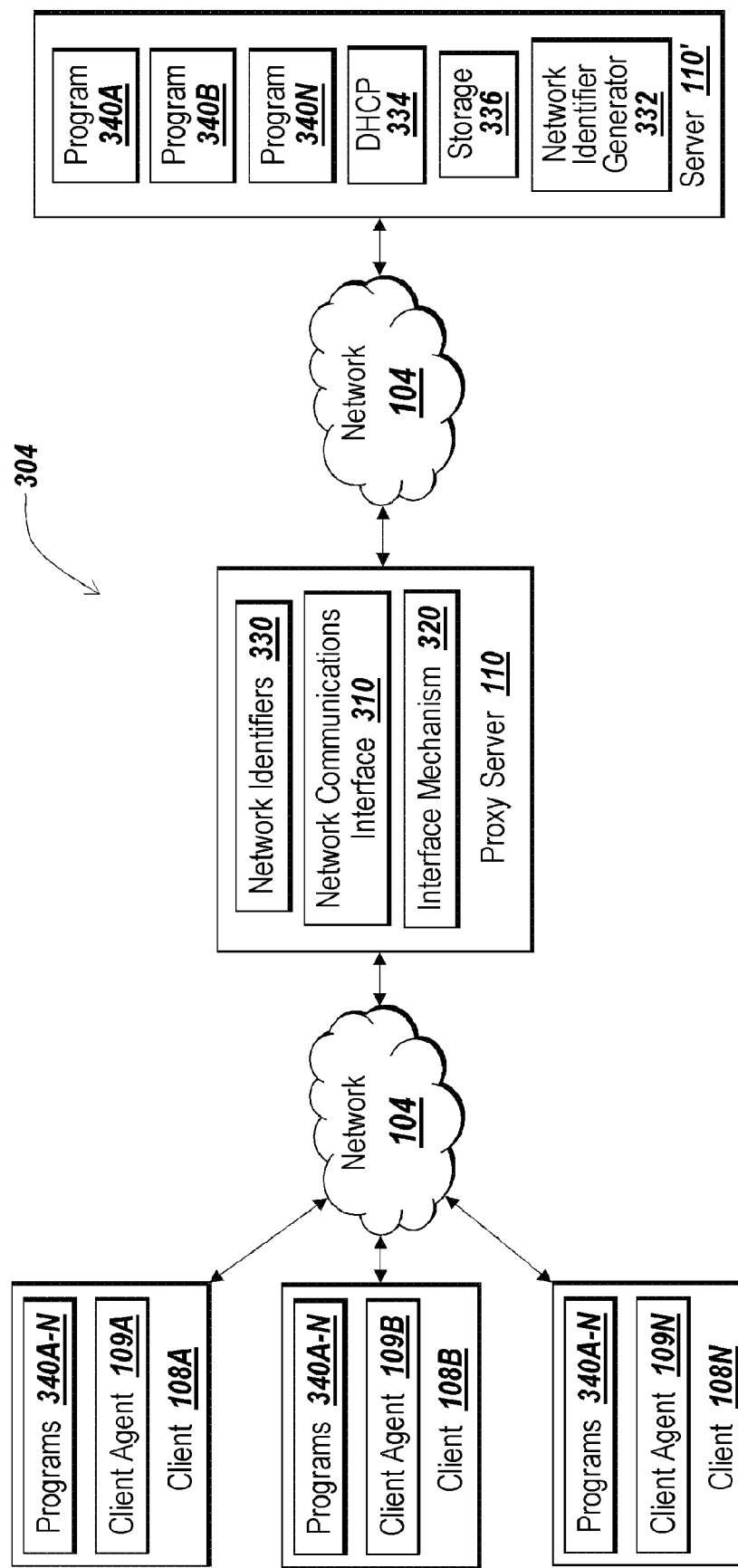
FIG. 3C is a block diagram of an alternative embodiment of the present invention for assigning unique network identifiers with a proxy server in a client-server computer system.

FIGS. 3A-3C depict components of the present invention that allow unique network identifiers, such as an IP address or domain name, to be assigned to multiple programs running on a computer 100 or assigned to users of the programs.

Referring now to FIG. 3A, the system 300 is a client-server system comprising a client 108 and server 110 communicating over a network 104. The client 108 has a network communication interface 310, an interface mechanism 320, a plurality of network identifiers 330 and one or more programs 340a-340b. The network communication interface 310 includes any and all of the network related hardware and software required for the client 108 to communicate over the network 104. For example, the network communication interface 310 includes any network adapter 118 of the computer 100 and any other software and/or hardware, such as operating system provided software and interfaces, necessary for the computer 100 to communicate over the network 104.

The interface mechanism 320 comprises a socket library 332 and a TCP stack 324 in order to provide a unique network identifier from the plurality of network identifiers 330 that may be available to each of the programs 340a-340n running on the client 108. The socket library 322 is a general purpose networking application programming interface or API to access network services provided by the operating system. Briefly stated, a socket is an end point for interprocess communication, either locally or over a network running TCP/IP. Sockets can simultaneously transmit and receive data from another process, using semantics that depend on the type of socket. The socket interface can support a number of underlying transport mechanisms. Ideally, a program written with socket calls can be used with different network architectures and different local interprocess communication facilities with little or no changes. The socket library 322 can be the Winsock API from Microsoft, the Berkeley Software Distribution (BSD) socket library for Unix or any other supported architecture, other socket libraries based on the socket interface from University of California at Berkeley, or any other available socket library providing a socket based network programming API to communicate using TCP/IP over a network 104, which may or may not be based on the Winsock or the BSD API, and capable of operating on the computing device 100 as described herein.

The TCP stack 324 provides an implementation of the TCP/IP communications protocol engine in order for the client 108 to communicate using TCP/IP over the network 104. The TCP stack 324 includes TCP/IP software and hardware driver software, sometimes referred to as packet drivers, that allows a computer 100 to communicate via TCP/IP. Applications that use TCP/IP, such as an application making API calls to a socket library 322, require a TCP stack to operate on the computer where the application runs. The TCP stack 324, in one embodiment, may include the socket library 322 software, and in another embodiment, the socket library 322 software may be not be included with the TCP stack 324. In a typical computer 100, the operating system provides a single TCP stack 324 for applications to use for network communications via TCP/IP. For example, operating systems such as Microsoft Windows, versions of UNIX and Linux only support a single instance of the TCP stack 324. Additional TCP/IP software, socket library software and/or hardware driver software may be installed on the computer in addition to or instead of the similar software provided by the operating system. In an exemplary embodiment of the present invention, a single TCP stack 324 is used as provided by default by the operating system. In an alternative embodiment, the interface mechanism 320 may comprise a second TCP stack 324' in addition to the TCP stack 324 provided by the operating system. Each TCP stack 324, 324' may handle multiple users and/or programs communicating over the network 104.

Additionally, the interface mechanism 320 may be any type of software component and/or a special purpose hardware device, such as, for example, an ASIC or an FPGA. The one or more software components of the interface mechanism may each be embodied in a library, module, program, executable, application, service, process or task. Furthermore, the interface mechanism 320 may be made of several software components either running locally or distributed across multiple clients 108, 108' or servers 110, 110'. The interface mechanism 320 may include the socket library and a portion of or all of the TCP stack 324. One ordinarily skilled in the art will appreciate the various permutation of the possible alternative embodiments of the interface mechanism 320.

The client 108 may provide for or obtain a plurality of network identifiers 330 for the interface mechanism 320 to use in assigning unique network identifiers to one or more programs 340a-340n on the client 108. The network identifiers 330 may comprise IP addresses, domain or host names, or both IP addresses and host names. In a preferred embodiment, the network identifiers 330 comprise a unique list of IP addresses with each IP address having at least one unique host name associated with it. The network identifiers 330 may be statically defined in one embodiment, or dynamically determined in another embodiment. In some cases, some of the network identifiers 330 will be statically defined while other network identifiers 330 will be dynamically obtained from the client 108, server 110, or another client 108' or server 110' on the network 104.

The client 108 may obtain the network identifiers 330 many different ways and may receive a portion of the network identifiers 330 one way and other portions of the network identifiers 330 other ways. In one embodiment, the network identifiers 330 may be statically defined in a storage 336 location, such as a file, either remotely on the server 110 or on the client 108. For example, the local hosts file of the client 108 referenced by the operating system and TCP stack 324 in performing network operations using IP addresses and host names may contain a list of multiple network identifiers. In another embodiment, one or more of the network identifiers 330 are allocated or dedicated to a specific user.

In another embodiment, the client 108 obtains a one or more of the network identifiers from a server 110 accessible by the client 108 on the network 104. The server 110 may be a Dynamic Host Configuration Protocol server, also known as a DHCP server. DHCP is a standard for computers on a TCP/IP network to request from one or more central servers information such as the IP number, the netmask, the gateway, etc. that the computer should be using. The DHCP protocol provides for assigning dynamic IP addresses to devices on a network and supports a mix of static and dynamic IP addresses. DHCP consists of two components: a protocol for delivering host-specific configuration parameters from a DHCP server 334 to a client 108 and a mechanism for allocation of network addresses to clients 108, 108'.

In another embodiment, the client 108 obtains one or more of the network identifiers 330 from a network identifier generator 330, which can run on the server 110, or on the client 108, or on another client 108' or server 110' which is accessible by the client 108 on the network 104. The network identifier generator 330 may have an algorithm engine, business rule or logic engine for generating one or more of the network identifiers 330 for the client 108 or the server 110. The network identifier generator 332 may generate a sequential series of IP addresses and/or host names. In another embodiment, the network identifier generator 332 may generate a random set of numbers with the numbers corresponding accordingly to the appropriate IP dot numbering scheme for the network 104. In another case, the network identifier generator 332 may use any combination of a user name, computer name, domain name or other descriptive strings of text in generating a host name for any of the IP addresses of the network identifiers 330. Furthermore, the network identifier generator 332 may have business rule logic that applies different addressing and generation schemes depending on the client 108 or server 110 requesting or obtaining the network identifiers 330 from the network identifier generator 332. One ordinarily skilled in the art will recognize that the network identifier generator 332 can apply a wide range of algorithms for generating network identifiers and apply a wide range of business rule logic for providing network identifiers to one or more computers on a network 104.

The client 108 may obtain, provide or be assigned a maximum number of unique network identifiers 330 as the client 108 or server 110 may be able to host. In other embodiments, the client may obtain, provide or be assigned less than a maximum number of unique network identifiers 330 as may be determined based on the number of users, number of programs or other factors impacting the need for assigning unique network identifiers 330 to programs 340a-304n or users on the client 108. In one embodiment, the number of network identifiers 330 is a configurable parameter.

The client 108 may obtain a portion of the network identifiers 330 from the server 110, such as a storage location 336, another portion from a DHCP server 334, another portion from the network identifier generator 332 and yet another portion locally on the client 108. Furthermore, the client 108, the server 110, or any programs 340a-340b on the client 108, the interface mechanism 310 of the client 108, or any program on the server 110 may obtain one or more network identifiers programmatically by making any API calls, such as operating system level API calls, or by using any configuration tool provided by the operating system or other application to obtain network identifiers 330. One ordinarily skilled in the art will appreciate the various permutations and alternative embodiments for the client 108 to obtain or provide for a plurality of network identifiers 330 for the present invention.

The client may provide for one or more programs 340a-340n to execute on the client 108. The programs 340a-340n can be any application, software or computer program capable of being invoked, executed on or processed by the computing device 100 of the client 108. For example, the program 340a-340n can be any general purpose desktop application such as Microsoft Windows Explorer. The program 340a-340n could also be any type of web interface accessing services provided over the network 104 via one or more servers 110, 110'. The program 304a-340n can be an enterprise application client accessing the server 110 over the network 104. In another case, the program 340a-340n can be a custom application written in any programming language and compiled to execute on the client 108. In one embodiment, the program 340a-340n is any program that is causing network communications over the network 104 to which a network identifier would be provided in the network communications. For example, the program 340a-340n may make socket related API call through the socket library 322 using the TCP stack 324 to communicate to the network 104 through the network communication interface 310.

In one embodiment, the program 340a-340n comprises an application isolation environment, which provides an execution context within a computing device 100 to separate, or isolate, a group of processes from another set of processes running in a separate instance of an application isolation environment. The isolation of processes in separate contexts protects one set of processes from issues generated from another set of processes. Typically, application isolation occurs at the process level where processes running in one execution context do not directly use the address space in memory used by other processes running in another execution context. However, an application isolation environment can provide any level of virtualization of operating system resources so as to separate or isolate the use of those resources by any program running 340a-340n in each application isolation environment 340a-340n. By way of example, on the client 108, program 340a can provide an application isolation environment for one or more programs 340a-340n to run in while program 340b provides a second application isolation environment for another set of one or more programs 340a-340n to run in.

In another embodiment, the programs 340a-340n can comprise a thin-client program for accessing applications, programs and services on a server 110 using a remote display protocol. For example, any of the programs 340a-340n may be an Independent Computing Architecture (ICA) client from Citrix Systems, Inc. of Fort Lauderdale, Fla., or a Remote Desktop Protocol (RDP) client from Microsoft Corporation of Redmond. These thin-client programs 340a-340n provide access to user sessions running on the server 110, or one or more other servers 110', 110', such as multiple servers in a server farm or server cluster. As such, the program 340a-340n can be a user session hosted by the client 108 or the server 110.

In one embodiment, each of the programs 340a-340n can be running different types of applications, application isolation environments, or user sessions. For example, program 340a may be an enterprise application client providing web access to enterprise application servers on the network. Program 340b may be an application isolation environment providing an execution context for a user to run one or more programs. Program 340n may be a thin-client program running a user session on the server 110. In another embodiment, the programs 340a-340n may be any type of service running in the operating system. Additionally, a program 340a-340n can also be referred to as any service, task, process, or thread running on the client 108a-108n, or any combination thereof. One of ordinary skill in the art will recognize that the programs 340a-340n may be any type of program capable of executing on the computing device 100 of the client 108 or server 110 and that multiple types of programs may run subsequently or concurrently on the client 108 or the server 110 by one or more of the same user or different users.

In operation, the interface mechanism 310 of the client 108 provides for the association of unique network identifiers from the plurality of network identifiers 330 to the programs 340a-340n running on the computer or to users of the programs 340a-340n. Although there may be a single operating system, TCP stack 324 and socket library 322 supporting the network communications of the programs 340a-340n, the interface mechanism 320 locks, or binds, each user or program 340a-340n to a unique network identifier so that network communications from that user or program from the same client 108 has a unique network identifier. Without the interface mechanism of the present invention, each user or program 340a-340n of the client 108 would generate network communications with the same network identifier assigned to the client 108.

The interface mechanism 320 obtains and/or selects a network identifier from the plurality of network identifiers 330 to associate and assign to a program 340a-340n or user of the programs 340a-340n. The interface mechanism 320 may obtain a network identifier from the plurality of network identifiers 330 programmatically through an API call, such as an API call to a DHCP server. The interface mechanism 320 may obtain a network identifier for a program 340a-340b through any other form of interfacing by which it could obtain a network identifier, such as for example, reading a row of data from a file, such as a local hosts file, or by querying a row of data from a database. The interface mechanism 320 may have one or more network identifiers stored in memory upon start up of the client 108. One ordinarily skill in the art will recognize the interface mechanism 320 may obtain a network identifier for a program 340a-340n in many different ways allowed by various known interfacing techniques.

The client 108, programs 340a-340n and/or interface mechanism 320 may obtain, select and/or assign a unique network identifier for a program 340a-340n or user at various times. In one embodiment, the client 108 may obtain one or more network identifiers upon booting or starting of the client 108. In another embodiment, the network identifier for a user may be obtained when the user logs into the client 108 or otherwise starts a user session. In one embodiment, the program 340a-340n and interface mechanism obtains, selects, and assigns a network identifier to the program 340a-340n upon establishment of or starting of the program 340a-340n. In another embodiment, the network identifier for the program 340a-340n is not obtained, selected or assigned until the program makes a call to the socket library 322. In other cases, the network identifier assigned to a program 340a-340n or a user of the client 308 may be released or returned at any point after is no longer needed by the interface mechanism 320 or the program 340a-340n. One ordinarily skilled in the art will recognize the many variations upon which a network identifier may be obtained, selected and/or assigned to a program 340a-340n or a user of the client 108 and in other cases returned to or released from the pool of network identifiers 330.

In an exemplary embodiment, the interface mechanism 320 locks in, or binds, a user or program 340a-340n to one of the network identifiers 330 by intercepting and modifying calls made to the socket library 322. Since there is typically a single TCP stack 324 with one IP address assigned to the client 108, applications usually do not specify an IP address of the client 108 in API calls to the socket library 322. The IP address of the client 108 is a well-known IP address identified in one global name space of the TCP stack 324. By intercepting and modifying socket library 322 API calls, the interface mechanism 320 can apply a specific network identifier to the API call instead of the socket library 322 using the IP address and/or host name assigned to the client 108 and already known by the TCP stack 324. After intercepting a socket library 322 API call, the interface mechanism 320 can apply a unique network identifier to the socket library 322 API call so that a network identifier is applied in making the API call. The interface mechanism 320 will apply the unique network identifier associated with the program 340a-340n or associated with the user of the program 340a-340n making the socket library 322 API call.

For socket based network communications, a program calling the socket library 322 API may perform a variety of API calls on a socket, the endpoint of communications between a source and destination process. An endpoint in TCP/IP networking is determined by a unique combination of an IP address and a port address, or port number. Multiple applications on the same client 108 can use the same IP address concurrently with different port addresses as each IP and port address combination defines a unique endpoint. However, the present invention allows multiple programs 340a-340n on the same client 108 to use the same port address concurrently. Since each program 340a-340n may obtain a different IP address, each endpoint, i.e., IP and port address, will be uniquely defined via the unique IP address assigned to the program 340a-340n. As such, a program 340a with a first IP address may be bound to the same port address as another program 340b with a second IP address on the same client 108.

The API of the socket library 322 defines function calls to create, close, read and write to/from a socket, among other socket related functions as described by the specific API implementation of the socket library 322, such as the WinSock API. In establishing socket communication, the IP address and the port of the source and destination processes must be provided to the socket library 322 API. Then send and receive API calls can be made on the socket. A socket can be bound to a specific network address by calling the bind function of the socket library 322. The interface mechanism 320 would bind the socket to the unique network identifier determined by the interface mechanism 320 as associated with or assigned to the program 340a-340b making the socket communications, or for the user accessing the program 340a-340n. This network identifier would be provided as the source address for the program 340a-340n on the client 108 and once the socket was mapped to this network identifier, all other socket based communications, such as a send API call, would use this network identifier as the source network address. The interface mechanism 320 will also make a program 340a-340n listen on a particular network identifier assigned to the program 340a-340n by replacing a generic listen socket API call with a listen API call for the specific network address. As such, the interface mechanism 320 would ensure that connections and packets would originate from the unique network identifier associated with the program 340a-340n. The socket library 322 may provide for API calls to determine the network identifier of the local process sending and/or receiving socket based communications. The interface mechanism 320 would intercept and modify these types of API calls to return the specified network identifier of the program 340a-340n.

The approach of having unique network identifiers assigned to a particular program 340a-304n or user on the client 108 can also be referred to as virtual IP addresses. The IP addresses are virtual in that although the client 108 is assigned an IP address, each of the programs 340a-340n and/or users running on the client 108 have an IP address unique from and different than the IP address already and typically assigned to the client 108. Furthermore, these virtual IP addresses can be used dynamically, with a virtual IP address being assigned and then unassigned on an as needed basis for a user or program 340a-340n The technique of intercepting and modifying socket library 322 calls can be applied to many operating systems such as the various types of Linux and UNIX operating systems that use a similar socket communications based approach and have socket libraries for such communications. Furthermore, it is advantageous to use an interface mechanism 320 with a single TCP stack 324 as many of these operating systems already use a single TCP stack 324 for network communications. In this case, the interface mechanism 320 would work with these standard available operating systems and be less intrusive on the operating system of the client 108, or other computing device 100 hosting the present invention.

In certain embodiments, the interface mechanism 320 can intercept and modify socket library 322 API calls by using the technology of a Layered Service Provider (LSP), a Namespace Service Provider (NSP) or other technology that will enable the interface mechanism 320 to hook, overwrite, overload, extend or otherwise intercept and modify socket library 322 API calls. For example, an LSP is a software component that can be inserted into a Windows TCP/IP handler like a link in a chain. The Winsock implementation from Microsoft provides a service provider interface between the API and the protocol stacks. The service provider interface would enable one to create their own service provider or extend an existing transport service provider by implementing a custom LSP.

Alternatively, instead of intercepting and modifying socket library 322 API calls, the interface mechanism 320 may comprise a custom or modified socket library 322 which provides the programming logic to use, provide or apply the unique network identifiers assigned to any of the programs 340a-340n or users. In another alternative embodiment, the interface mechanism 320 may use multiple TCP stacks 324, 324' and/or socket libraries 322, 322' for providing unique network identifiers to a portion of or all of the programs 340a-340n or the users of the client 108. For example, in one embodiment, a TCP stack 324 and socket library is assigned to each program 340a-340n or each user on the client 108. In yet another alternative embodiment, the interface mechanism 320 may comprise a network manipulation filter by which it filters packets of network traffic via the network communication interface 310. In this case, the interface mechanism 320 is intercepting and modifying network traffic sent to and from a program 340a-340n beyond or below the layer of the socket library 322. As such, the API calls to the socket library 322 would not be intercepted and modified but the network traffic generated from such calls would be intercepted and modified.

Referring now to FIG. 3B, system 302 depicts a client-server network system where the present invention of providing virtual IP addresses resides on the server 110. In an exemplary embodiment, the server 110 may be a multi-user server running remote display protocol servers such as Microsoft Terminal Server or Citrix Presentation Server, which allow users to connect to the server 110 to run applications from the server 110 and have output from the running of the application display on the clients 108a-108n. In broad overview, any one or all of the clients 108a-108n may connect to the server 110 over the network 104. The server 110 may have a network communication interface 310, an interface mechanism 320, a network identifier generator 332, network identifiers 330, and one or more programs 340a-340n.

The clients 108a-108n may have a client agent 109a-109b to provide additional application functionality to the client or allow the client to access services on another system such as the server 110. For example, a client agent 109a-109n may be a remote display client, such as any of the remote display clients from Microsoft or Citrix that work in conjunction with Microsoft Terminal Server or Citrix Presentation Server that may be running on the server 110. In these cases, the client 108a-108n would connect to the server 110 and establish a user session on the server 110. The server 110 may concurrently and/or subsequently host multiple user sessions. For example, the server 110 may concurrently host a user session for a first user from client 108a and a user session from a second user from client 108b. In another embodiment, the user session of the first user from client 108a may be hosted by the server 110 after the server terminates hosting of the user session of the second user from client 108b.

Without the present invention, each of the user sessions hosted on the server 110 would use the IP address assigned to the server 110. So although different users are using the server 110, the network traffic generated from each user would share the same IP address of the server 110. With the present invention, each user session hosted on the server 110 via the programs 340a-340n may be assigned a unique network identifier different than the servers 110 network identifier. If the user is running more than one program 340a-340n, each user program 340a-340n may be assigned a network identifier associated with the user. In a similar fashion as described with FIG. 3A, the interface mechanism 320 on the server 110 would obtain, select and assign a unique network identifier from the plurality of network identifiers 330 and apply accordingly the network identifier to network communications of the programs 340a-340n using the intercept and modify technique with regards to the socket library 322.

Referring now to FIG. 3C, system 304 depicts an alternative embodiment of the present invention for providing virtual IP addresses where the interface mechanism 320 is deployed on a proxy server 110. In brief overview, one or more of the clients 108a-108n may connect to the server 11I via a proxy server 110. The clients 108a-108n may communicate via the proxy server 110 to the server 110' by a VPN protocol or some other tunneling or encapsulation protocol. Furthermore, any of the clients 108a-108n may be a server, server farm, or other multi-user server. The server 110' may be on the same network 104 as the proxy server 110 or on a different network 104'.

The proxy server 110 may comprise the plurality of network identifiers 330 to be assigned to any of the programs 340a-340n residing on any of the clients 108a-108n or the server 110'. The interface mechanism 320 on the proxy server 110 would manage the assignment of network identifiers to network traffic passing through the proxy server 110 between the client 108a-108n and the server 110' that is associated with a specific program 340a-340n or user of the client 108a-108n or the server 110'. Since the clients 108a-108n or the server 110' would not bind the network identifier to the specific program 340a-340n or user prior to communicating network traffic, the proxy server 110 and the interface mechanism 320 would need to manage the context of network traffic from the user or program 340a-340n to appropriately apply the unique network identifier.

Figure 4:
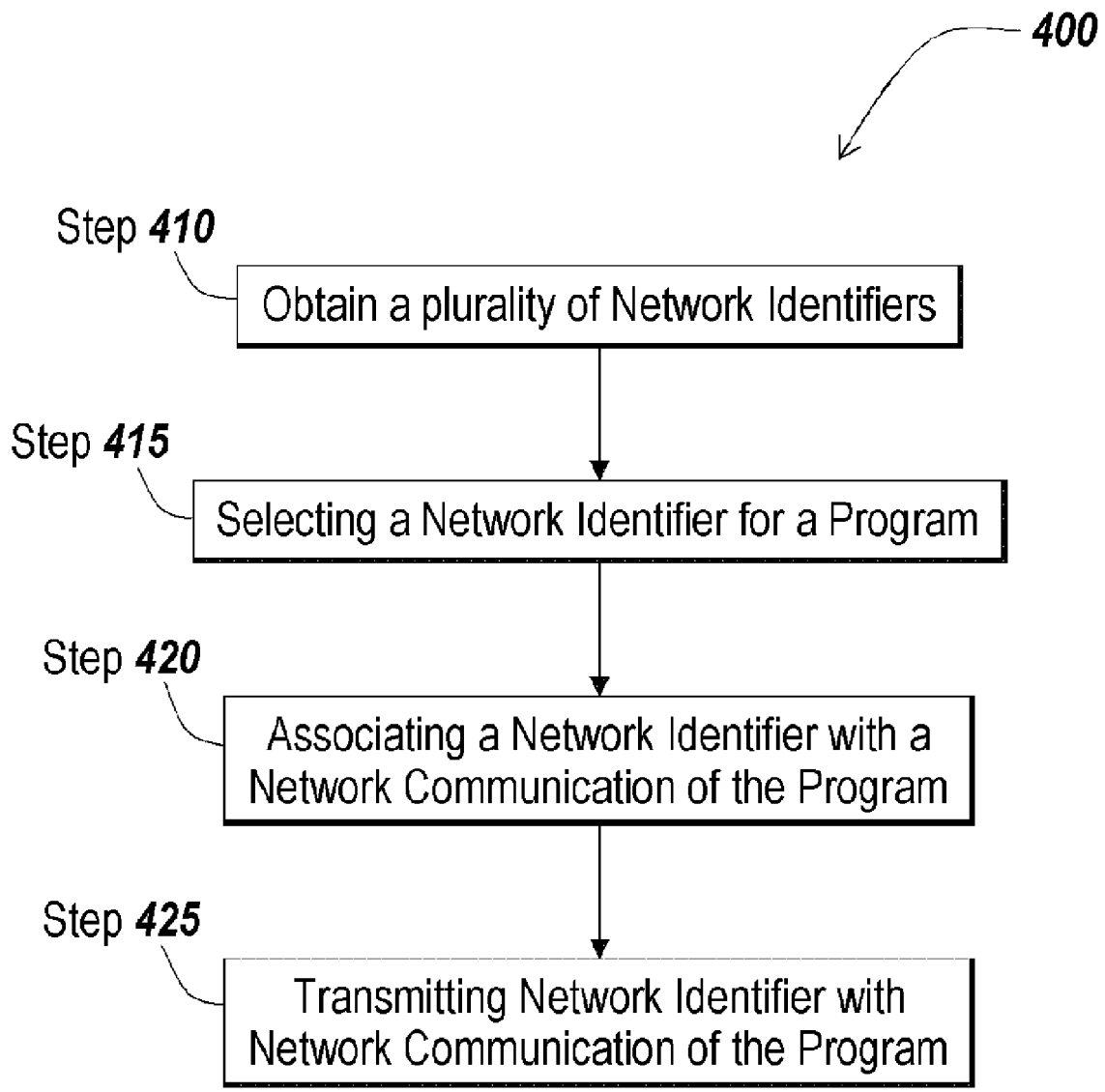
FIG. 4 is a flow diagram of steps performed in embodiments of FIGS. 3A-3C.

In one aspect, the present invention relates to methods for assigning unique network identifiers to one or more programs 340a-340n and/or users of a computer 100, such as the client 108 or the server 110. FIG. 4 depicts a flow diagram of the steps of a method 400 for practicing the present invention as shown in FIGS. 3A-3C. The method 400 comprises the steps of obtaining a plurality of network identifiers (step 410), selecting a network identifier for a program (step 415), associating a network identifier with network communication of the program (step 420) and transmitting the network identifier with network communication of the program (step 425). This method 400 can be repeated for each of the programs 340a-340n, or optionally, at any of the steps of method 400, the step can be performed for multiple programs 340a-340n, or users. In another embodiment, the method 400 can applied to each user of the client 108 or server 110.

At step 410, the computer 100, such as the client 108, the server 110, or the proxy server 110, obtains a plurality of network identifiers 330. One or more of the network identifiers 330 may be obtained from a server 110 separate from the computer obtaining the network identifiers. Optionally, one or more of the network identifiers 330 may be obtained from a DHCP server. In another embodiment, one or more of the network identifiers 330 may be obtained from a storage location 336 such as a file system or database locally on the computer 100 or remotely on a server 110 or client 108. In another embodiment, one or more the network identifiers 330 may be obtained from a network identifier generator 332. For step 410, a plurality of network identifiers 330 may be obtained by all or a portion of the above alternative embodiments of the step. Furthermore, one or more of the network identifiers 330 may be allocated specifically to a user or on a user basis. In one embodiment, the network identifier is obtained for a user when a user starts a user session on the client 108. As described in relation to FIG. 3A, one ordinarily skilled in the art will appreciate the various permutations of step 410 in obtaining a plurality of network identifiers 330.

At step 415, the interface mechanism 320 selects a network identifier from the plurality of network identifiers 330 for a program invoked, executing or otherwise running on the computer 100, such as the client 108 or the server 110. The network identifier may be selected on booting up or starting of the computer 100. In another embodiment, the network identifier may be selected when the program 340a-340n is invoked on the computer or in yet another embodiment, when the program 340a-340n makes its first call to the socket library 322. In further embodiments, the network identifier 330 selected for a program 340a-340n may be released or returned once the program 340a-340n is terminated or otherwise complete socket communications.

At step 420, the interface mechanism 320 associates the selected network identifier with the network communications of the program 340a-340n. In an exemplary embodiment, step 420 includes the intercepting and modifying technique discussed in relation to FIG. 3A. In other embodiments, the step 420 may include using multiple TCP stacks 324 or a network manipulation filter. At step 425, the method 400 provides for the transmitting of the selected and associated, or assigned, network identifier of a program 340a-340n with network communication of the program 340a-340n. The interface mechanism 320 interfaces with the network communication interface 310 to transmit the assigned network identifier with the network communications of the program 340a-340n.

In another aspect, the techniques of the present invention for assigning unique network identifiers for programs 340a-340n can also be applied to local inter-process communications using the loopback interface of a computer 100. The IP protocol specifies a loopback network and most IP implementation support a loopback interface. A loopback is a communications channel with only one endpoint so that any traffic that a computer program sends on the loopback network is addressed to the same computer. The most commonly used loopback IP address is 127.0.0.1 with a host name or domain name of localhost. Any of the loopback addresses in the 127.X.X.X range are considered loopback addresses by the TCP stack 324. On a UNIX like system, the loopback interface is commonly referred to as device lo or lo0. A loopback interface may have several uses. Some applications use the loopback address to establish an inter-process communication between programs running locally. In other cases, pinging the loopback address can be used to test if the TCP stack is working. Additionally, the loopback interface may be used to test software without needing to actually access the network 104.

Figure 5:
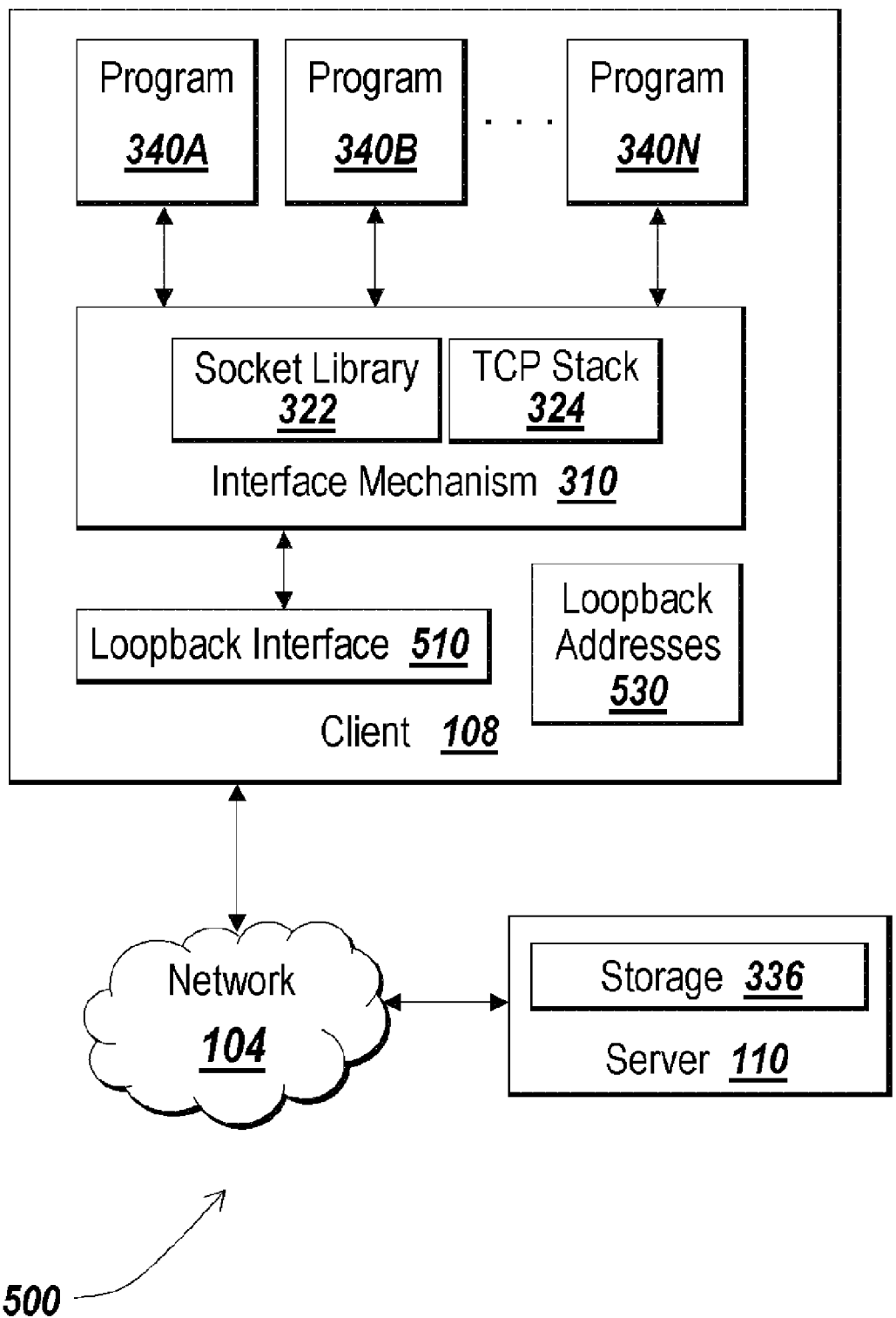
FIG. 5 is a block diagram of the components of an embodiment of the present invention for assigning unique loopback addresses.

FIG. 5 depicts a block diagram of a computer system 500 applying the techniques of the present invention to the loopback interface 510 of a client computer 108. In brief overview, the client 108 comprises a loopback interface 510, an interface mechanism 310, a plurality of loopback addresses 530, and one or more programs 340a-340n. The client 108 is connected to a network 104 by which the client 108 can access a server 110. The server 110 may comprise a storage 336 having one or more loopback addresses, and I may further comprise a loopback address generator 532.

The client 108 may provide for or obtain a plurality of loopback addresses 530 for the interface mechanism 320 to use in assigning unique loopback addresses to one or more programs 340a-340n or one or more users on the client 108. The loopback addresses 530 may comprise IP addresses, domain or host names or both IP addresses and host names, which would be intended for use as a loopback address for the loopback interface 510.

In an exemplary embodiment, the loopback addresses 530 comprises a unique list of IP addresses with each IP address having at least one unique host name associated with it. The loopback addresses 530 may be statically defined in one embodiment, or dynamically determined in another embodiment. In some cases, some of the loopback addresses 530 will be statically defined while other loopback addresses 530 will be dynamically obtained from the client 108, server 110, or another client 108 or server 110' on the network 104. Similar to the network identifiers in FIGS. 3A-3C, the client 108 may obtain the loopback addresses 530 many different ways and may receive a portion of the loopback addresses 530 one way and other portions of the loopback addresses 530 other ways. In one embodiment, the loopback addresses 530 may be statically defined in a storage 336 location, such as a file, either remotely on the server 110 or alternatively, on the client 108 or another client 108' or server 110' on the network 104. For example, the local hosts file of the client 108 referenced by the operating system and TCP stack 324 in performing the loopback interface 510 may contain a list of multiple loopback addresses. In another embodiment, one or more of the loopback addresses 530 are allocated or dedicated to a specific user. In another embodiment, the client 108 obtains one or more of the loopback addresses 530 from a server 110 accessible by the client 108 on the network 104. In yet another embodiment, one or more of the loopback addresses may be obtained from a loopback address generator running on either the server 110 as shown, or optionally on the client 108 (not shown). The loopback address generator 532 may run any of the similar address generating schemes and business rule logic as with the network identifier generator 332. As with the network identifiers 330 of FIGS. 3A-3C, one ordinarily skilled in the art will recognize the client 108 may provide or obtain a plurality of loopback addresses 530 in many different ways.

Furthermore, the client 108 may obtain, provide or be assigned a maximum number of unique loopback addresses 330 as the client 108 may be able to have, or host or otherwise supported by the loopback interface 510. For example, there may be one loopback address for each of the users of the client 108 up to the maximum numbers of specific users the client 108 can host, either concurrently or subsequently. In other embodiments, the client may obtain, provide or be assigned less than a maximum number of unique loopback addresses 530 as may be determined based on the number of users, number of programs or other factors impacting the need for assigning unique loopback addresses to programs 340a-304n or users on the client 108. In one embodiment, the number of loopback addresses 530 is a configurable parameter.

The loopback interface 510 includes any and all of the network related hardware and software required for the client 108 to communicate with the loopback interface 510. For example, the loopback interface 510 includes any software and/or hardware, such as operating system provided software and interfaces, that implements the loopback network of the client 108.

The interface mechanism 310 comprises a socket library 322 and a TCP stack 324, and as described in conjunction with FIG. 3A may have other embodiments. Also, as further described in conjunction with FIG. 3A, the interface mechanism 310 in FIG. 5 performs a similar intercepting and binding technique for applying unique loopback addresses to programs 340a-304n or users on the client 108. Any of the programs 340a-340n communicating to the loopback interface 510 would make API calls to the socket library 322 as they would when performing socket based communications over the network 104. However, a local host address or loopback address would be specified as the source and/or destination communication endpoint so that all communications stay local to the client 108 but exercise a portion of the TCP stack 324 as implemented by the loopback interface 510.

By way of example, program 340a on client 108 may be a web client establishing local inter-process communications with a local web server 340b. The programs 340a and 340b may establish the inter-process communications by make API calls using the default localhost address of 127.0.0.1. Instead of using the typical localhost address of 127.0.0.1 assigned to the client 108, the interface mechanism 320 would apply a unique loopback address, from the unique loopback addresses 330, for example 127.0.0.101, to the inter-process communications between program 340a and program 340b. In an exemplary example, the programs 340a and 340n continue to make API calls using the 127.0.0.1 address. However, the interface mechanism 320 substitutes the default address with a unique loopback address from the loopback addresses 330 in the 127.X.X.X range recognized as a loopback address by the TCP stack 324. In this case, the programs 340a-340n are not aware of the substitution and continue to perform as if the programs 340a-340n were using the 127.0.0.1 address.

This loopback address may be program 340a-340n specific or may be assigned to or dedicated to the user running the program 340a-340n. The web server of program 340b may point the web client of program 340a to the local URL address of 127.0.0.101 to access the web site provide by the web server locally to the client 108. While program 340a and 340b use the unique loopback address that may be different than the one assigned to the client 108, a second set of programs, 340*c* and 340*d*, may also establish local inter-process communication with a unique loopback address such as 127.0.0.102, different from the loopback address of the programs 340*a* and 340*b*, and different than the default loopback address of 127.0.0.1 of the client 108. Like programs 340*a* and 340*b* in the above example, the second set of programs 340*c* and 340*d* also make API calls using the 127.0.0.1 address but the interface mechanism 320 automatically substitutes a unique loopback address in the 127.X.X.X range.

By applying unique loopback addresses 530 to one or more of the programs 340*a*-340*n* or users of the client 108, the present invention allows multiple loopback interface inter-process communications to occur concurrently or simultaneously. Without the present invention, the first set of programs 340*a* and 340*b* and the second set of programs 340*c* and 340*d* would have had to use the same local loopback address, such as the typical default of 127.0.0.1, causing one of the set of programs not to work properly. Additionally, the present invention as it applies to loopback addresses allows monitoring systems and applications to associate inter-process loopback communications with a particular program or user.

Figure 6:
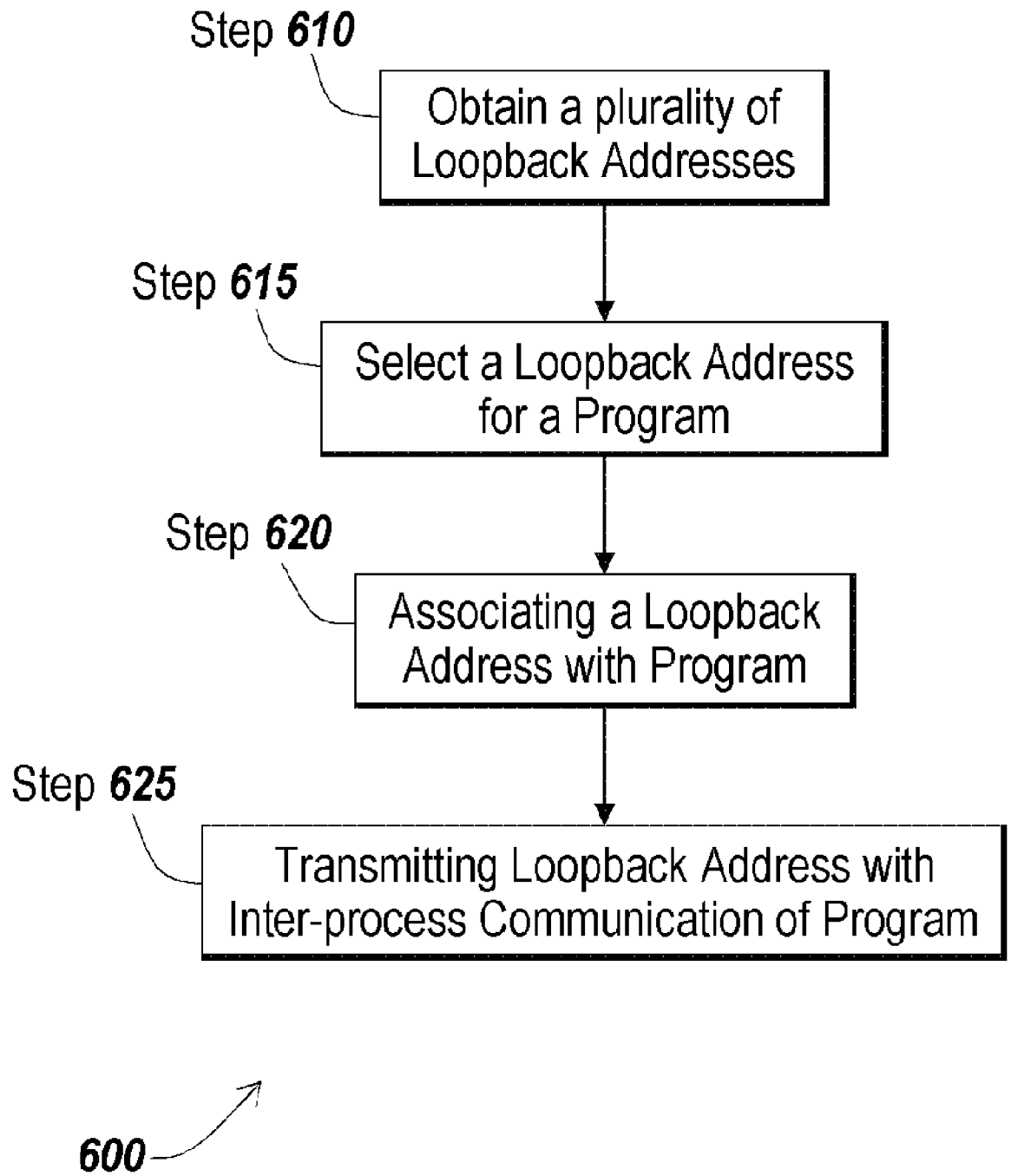
FIG. 6 is flow diagram of steps performed in an embodiment of FIG. 5.

In another aspect, the present invention relates to methods for assigning unique loopback addresses to one or more programs 340*a*-340*n* and/or users of a computer 100, such as the client 108 or the server 110. FIG. 6 depicts a flow diagram of the steps of a method 600 for practicing the present invention as shown in FIG. 5. The method 600 comprises the steps of obtaining a plurality of loopback addresses (step 610), selecting a loopback addresses from the plurality of loopback addresses for a program (step 615), associating a loopback address with loopback interface communication of the program (step 620) and transmitting the loopback address with loopback interface communication of the program (step 625). This method 600 can be repeated for each of the programs 340*a*-340*n*, or optionally, at any of the steps of method 600, the step can be performed for multiple programs 340*a*-340*n*. In another embodiment, the method 600 can be applied to each user of the client 108

At step 610, the client 108 obtains a plurality of loopback addresses 530. One or more of the loopback addresses 530 may be obtained from a server 110 separate from the client 108. In one embodiment, one or more of the loopback addresses 530 may be obtained from a storage location 336 such as a file system or database remotely on a server 110 or optionally, locally, on the client 108. In another embodiment, one or more the loopback addresses 530 may be obtained from a loopback address generator 532. For step 610, a plurality of loopback addresses 530 may be obtained by all or a portion of the above alternative embodiments of the step. Furthermore, one or more of the loopback addresses 530 may be allocated specifically to a user. As described in relation to FIG. 5, one ordinarily skilled in the art will appreciate the various permutations of step 610 in obtaining a plurality of loopback addresses 530.

At step 615, the interface mechanism 320 selects a loopback address from the plurality of loopback addresses 530 for a program invoked, executing or otherwise running on the computer 100, such as the client 108 or the server 110. The loopback address may be selected on booting up or starting of the client 108. In another embodiment, the loopback address may be selected when the program 340*a*-340*n* is invoked on the client 108 or in yet another embodiment, when the program 340*a*-340*n* makes its first call to the socket library 322. In another embodiment, the loopback address is selected on a user basis. In one embodiment, the loopback address is obtained and/or selected for a user when a user starts a user session on the client 108. In further embodiments, the loopback address selected for a program 340*a*-340*n* may be released or returned once the program 340*a*-340*n* is terminated or otherwise complete socket communications.

At step 620, the interface mechanism 320 associates the selected loopback address with the loopback interface communications of the program 340*a*-340*n*. In an exemplary embodiment, step 620 includes the intercepting and modifying technique discussed in relation to FIG. 5 and FIG. 3A. In other embodiments, the step 620 may include using multiple TCP stacks 324 or a network manipulation filter. At step 625, the method 600 provides for the transmitting of the selected and associated, or assigned loopback address of a program 340*a*-340*n* with loopback interface communication of the program 340*a*-340*n*. The interface mechanism 320 interfaces with the loopback interface 510 to transmit the assigned loopback address with the loopback interface communications of the program 340*a*-340*n*.

In another aspect, the present inventions relates to providing a uniform addressing scheme for associating virtual host names with users as they roam in a network 104. As discussed above, the present invention allows unique network identifiers to be assigned dynamically to either programs or users upon start of the program or upon start of the user session. As such, a user can be dynamically "bound" to a virtual host name so that the user will always use the same host name, and in some cases the same IP address, regardless of the computer the user may be using to access the network. A virtual host name and/or virtual IP address can be allocated to a specific user and follow the user as the user roams the network from one computer to another or from one sub-network to another.

Figure 7:
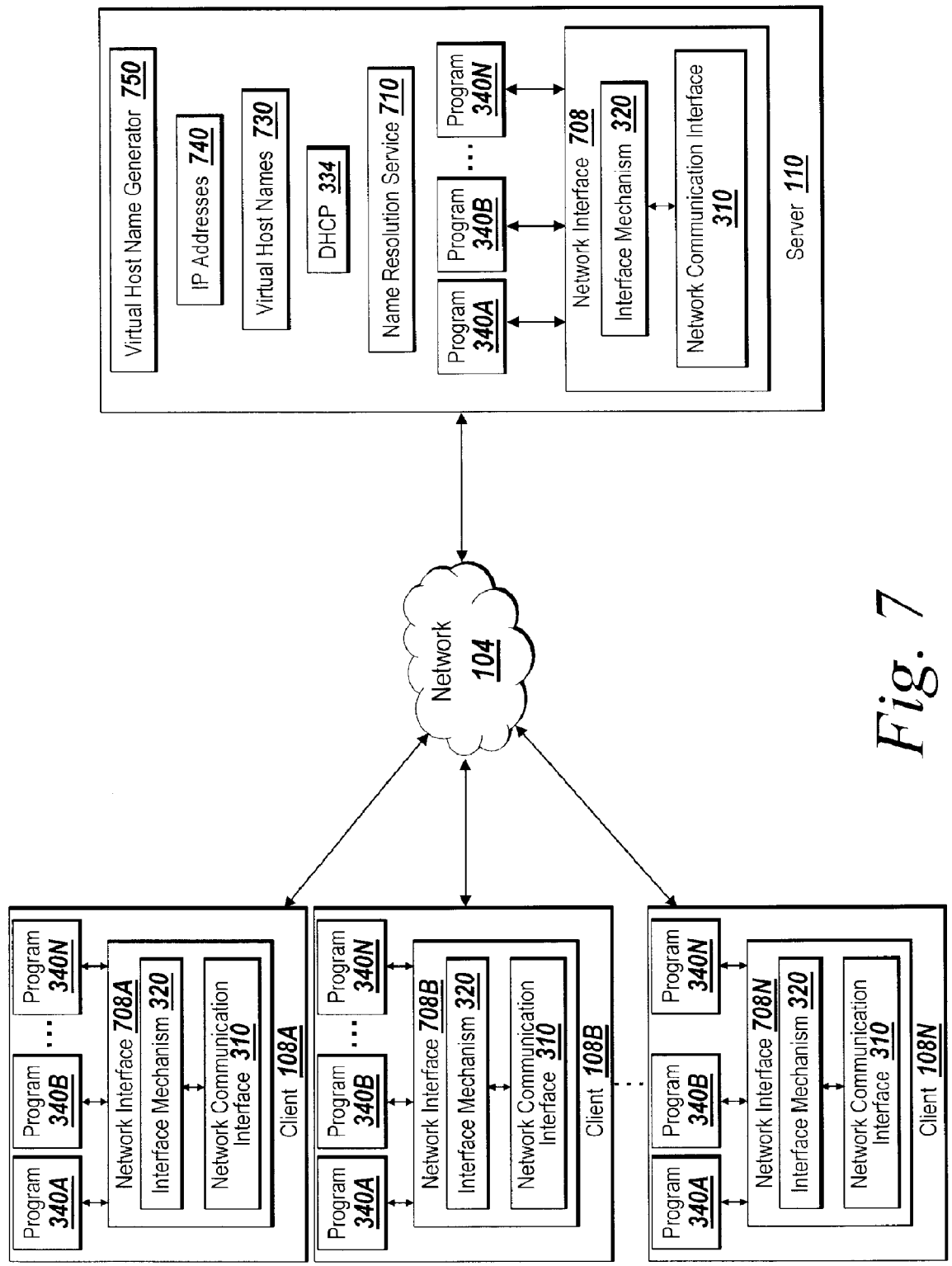
FIG. 7 is a block diagram of an embodiment of the present invention for a uniform addressing scheme.

Referring now to FIG. 7 is a block diagram depicting a client-server system for practicing an embodiment of the present invention. In brief overview, one or more clients 108*a*-108*n* connect to a network 104 and access a server 110. The network 104 may comprise one or more sub-networks 104' or may be multiple networks 104, 104', etc. The server 110 comprises a name resolution service 710, a set of virtual host names 730 and IP addresses 740 and optionally, a DHCP server 334. The server 110 could be a server farm, server cluster, or other multiple server system, including servers 110, 110', 110', etc. Each of the client 108*a*-108*n* and the server 110 may be able to invoke, run or otherwise execute programs 340*a*-340*n*. In certain embodiments, a program 340*a*-340*n* on a client 108*a* may be used for establishing a user session on a multi-user server 110 or server farm 110', with the user session on the server 110 comprising a program 340*b* running on the server 110. Each client 108*a*-108*n* includes a network interface 708*a*-708*n* for performing network interfacing of the present invention. In an exemplary embodiment, one or more of the network interfaces 708*a*-708*n* includes the interface mechanism 320 as described with FIGS. 3A-3C and FIG. 5 for assigning unique network identifiers to programs 340*a*-340*n* and/or users.

The server 110 may have a DHCP server 334 for dynamically assigning IP addresses to clients 108*a*-108*n* and/or the interface mechanism 320 of the network interface 708*a*-708*n* of a client 108*a*-108*n*. For example, when a user session starts, a new IP address can be obtained from the DHCP server 334 and when the user session ends, the IP address can be released and returned back to the pool of IP addresses of the DHCP server 334. Optionally, the DHCP server 334 could be on another server 110' on the network 104. DHCP 334 can be configured to reserve IP addresses, and one or more IP addresses can be reserved for a particular name, such as a user or host name. In addition to providing a client 108*a*-108*n* the information of the IP address, subnet mask and default gateway of the client 108*a*-108*n*, the DHCP server 334 can provide other information such as the address of a name resolution service or any other information configured to be provided by DHCP 334. Furthermore, the DHCP server 334 is able to receive information about a particular name with a reservation, such as a user name or host name, when receiving a request for an IP address assignment from a client 108*a*-108*n*. In this manner, the DHCP server 334 can return a reserved IP address associated with a name in the request. In certain embodiments, the clients 108*a*-108*n* may obtain one or more IP addresses from the DHCP server 334. In other embodiments, the clients 108*a*-108*n* may obtain one or more IP addresses separate from the DHCP server 334, for example, from a file on the client 108 or from a storage on the server 110. The client 108 of FIG. 7 can obtain IP addresses in any of the ways discussed in relation to FIG. 3A.

The server 110 may comprise a name resolution service 710, such as a Domain Name Server (DNS). Alternatively, the name resolution service 710 may run on another server 110' on the network 104, or one or more servers 110', 110' on the network 104. A name resolution service such as a DNS server maintains centralized lists of domain names, or host names, to IP addresses and maps requests specified by domain name to the respective IP address. Host names can be registered with the name resolution services 710 or can be updated dynamically. In one embodiment, the name resolution service comprises WINS, the Microsoft Windows Internet Naming Service that translates a host name into an IP address using the NETBIOS API over TCP/IP. Although the name resolution service 710, such as DNS, may dynamically update records as a clients 108*a*-180*n* IP address changes, e.g. dynamically assigned by a DHCP server 334, the name resolution service 710 is only tracking the IP address of the client 108*a*-108*n*.

In operation of the client-server system 700, a program 340*a*-340*n* is invoked on a client 108*a*-108*n*. The client 108*a*-108*n*, program 304*a*-304*n* or the network interface 708*a*-708*n* can dynamically request an IP address, for example, from the DHCP server 334 and can "bind" the IP address with the user name of the user invoking the program 340*a* or the user currently logged into the client 108*a*-108*n*. When the client 108*a*-108*n*, program 304*a*-304*n* or network interface 708*a*-708*n* requests an IP address from the DHCP server 334, it can report the name of the user with the request. In an exemplary embodiment, the DHCP server 334 may be configured to reserve an IP address for the user reported to it via the IP address request. The DHCP server 334 can then return the reserved IP address to the client 108*a* and therefore effectively binding the user to the reserved IP address.

In another embodiment, the client 108*a*-108*n* may retrieve an IP address from the plurality of network identifiers 330 as described in conjunction with FIGS. 3A-3C. The client 108*a*-108*n* can then make system API calls to update the DHCP server 334 with the IP address obtained for the virtual host name. In another embodiment, the client 108*a* may register the virtual host name with the name resolution service 710 and provide the IP address it obtained from making the system call. In yet another embodiment, the client 108*a*-108*n* may obtain an IP address from a DHCP server 334 and register the virtual host name for the IP address obtained from the DHCP server 334 with the name resolution service 710.

The virtual host name for a user or a program 340*a*-304*n* can be dynamically created and can be based on the user name associated with the user session or the user who invoked the program 340*a*-340*n*. In another embodiment, the virtual host name can be statically defined in DHCP server 334 or the name resolution service 710. Optionally, it could be defined in another storage 336 location on the client 108*a*-108*n* or the server 110.

For example, a user named user1 on the network domain of mycompany may have a virtual host name of user1.mycompany.com. This virtual host name for user1 can be registered in DHCP server 334 and/or the name resolution service 710. In another embodiment, the virtual host name can be created when the user invokes a program 340*a*-340*n* such as a user session. Then the client 108*a*-108*n*, or the program 340*a*-340*n* or the network interface 708*a*-708*n* can dynamically update the name resolution service with the virtual host name for the user and provide the IP address assigned to the virtual host name, which also be reserved or allocated to the user.

Any of the client 108*a*-108*n*, the programs 340*a*-340*n* or the network interface 708*a*-708*n* may include a virtual host name generator 750 that dynamically creates a virtual host name for a user based on a variety of attributes and factors. The virtual host name may simply be the user name. In other cases, the virtual host name can be the user name combined with the host name of the client 108*a*-108*n*. In other cases, the virtual host name may be the user name combined with the domain name of the network 104. In other embodiments, the virtual host name may depend on the number of user sessions the user is concurrently running. In yet another embodiment, the virtual host name may depend on a logical name of the sub-network the client 108*a*-108*n* is connected to. One ordinarily skilled in the art will appreciate that the virtual host name can be formed from a portion of any type of characters or descriptive text that may be combined, concatenated, stripped or otherwise formed to make a virtual host name that may uniquely identify the user or login entity to which it is assigned.

The dynamic nature of assigning unique IP addresses to users rather than the client 108*a* enables the present invention to provide a uniform addressing scheme for roaming users. For example, a first user named user1 logs into the client 108*a*, which may have already been assigned a default IP address, such as 192.168.1.100. Upon invoking a user session or starting another program 340*a*-340*n*, the client 108*a* may request an IP address from the DHCP server 334. In the request to the DHCP server 334, the virtual host name of user1 may be provided. In one embodiment, the DHCP server 334 has reserved an IP address of 192.168.1.200 for user1 and provides this reserved IP address in responding to the request. As a result, user1 on client 108*a* has a virtual host name of user1 assigned to the reserved IP address of 192.168.1.200. This user1 virtual host name mapping to the IP address of 192.168.1.200 would be available in the name resolution service 710. As such, any lookups of the name resolution service 710 would show the virtual host name of user1 associated with the IP address of 192.168.1.200. Since the virtual host name is descriptive of the user, any lookups of the name resolution service would quickly identify users and their IP addresses and associate it with other information provided with the lookup.

The same user1 may terminate the user session on client 108*a* and move into another part of the network 104 and log into client 108*n* to invoke another user session. In a similar manner, an IP address for user1's user session on client 108*n* may be requested from the DHCP server 334. The request would include the virtual host name of user1 and the DHCP server 334 would provide the reserved IP address of 192.168.1.200. As such, user1 now has the same virtual host name and same IP address as the user session it had on client 108*a*. The virtual host name and IP address effectively roamed with the user as the user moved from client 108a-108n to client 108a-108n in the network 104. In this manner, the IP address and virtual host name assigned process has been decoupled from the physical computer to which a user session is running, which would already have an assigned IP address and host name to connect to the network 104.

If the same user1 has multiple sessions on different clients 108a-108n, separate IP addresses and virtual host names are required for each session. The virtual host naming scheme would need to account for these cases. For example, the client 108a-108n, the program 340a-304n, the network interface 708a-708n or optionally, a virtual host name generator 750 may create a virtual host name for each user session that identifies both the session and the user. For example, the first session of user1 may have a virtual host name of user1 session1 and the second session of user1 may have a virtual host name of user1.session2. A unique IP address may be assigned to each virtual host name from the DHCP server 334 or by the interface mechanism 320 of the network interface 708a-708n. While user1 has multiple user sessions with a uniform addressing scheme, other users can also have multiple users sessions each identified by a virtual host name following the uniform addressing scheme.

Uniform network addressing can be particularly useful in the cases of a user connecting through a proxy server as depicted in the illustrative embodiment of FIG. 3C. A proxy server 110, using VPN for example, can provide virtual IP addresses not limited by the topology of the network. In contrast, a DHCP server 334 is limited to providing IP addresses that work with the network topology. For example, the virtual IP addresses provided by a DHCP server may all be in the same range, e.g., 192.X.X.X, of IP addresses assigned to clients 108a-108n on the network 104. In the case of a user connecting to a network 104 and being assigned a virtual IP address provided by a DHCP server 334, the user will have a unique IP address in the same range as IP addresses assigned to clients 108a-108n on the network. Although the user still obtains a unique IP address, the IP address assigned to the user will be dependent on the network 104 the client 108a-108n is on. If a user connects to the network via a proxy server 110 as in FIG. 3C, the user can be provided a unique IP address that is not tied to the network topology of the network 104 of the proxy server, or the network 104 the user may access through the proxy server 110. By using the proxy server, a virtual IP address not associated with a network topology can be assigned to a user regardless of the client 108a-108n the user connects to the network 104 with.

This uniform addressing scheme with virtual host names can be applied to non multi-user computing environments such as a desktop as well as a multi-user system such as server or server farm hosting multiple user sessions concurrently with Microsoft Terminal Server or Citrix Meta Presentation Server. When a user logs into a desktop computer, an IP address for the user can be obtained and associated with a virtual host name for the user. For a multi-user system, the present invention allows the system to provide each user and user session, concurrent or otherwise, with an execution environment similar to a desktop computer environment where each user has a separate and unique IP address.

Additionally, the IP address assignment process can be decoupled from the virtual host name registration process. For example, the IP address can be obtained via a DHCP server 334 without reserving an IP address for a user or by any other means, such as the interface mechanism 320 of the network interface 708a-708n. Although the IP address has not been reserved or otherwise allocated to the user, the virtual host name may be registered with the name resolution service 710 based on the user name. This allows the virtual host name for a user to roam with the user across networks that may have different subnet addresses. The virtual host name remains the same for the user through the network 104 accessible name resolution service 710 while the IP address assigned to the virtual host name and therefore the user changes to account for the different IP address subnet addressing schemes. In another aspect, the uniform addressing scheme with virtual host names can also be used to provide location services of users on the network since the virtual host name will follow the user as the user roams the network. A lookup service can be provided to locate the user by the virtual host name and/or IP address assigned to the user.

Figure 8:
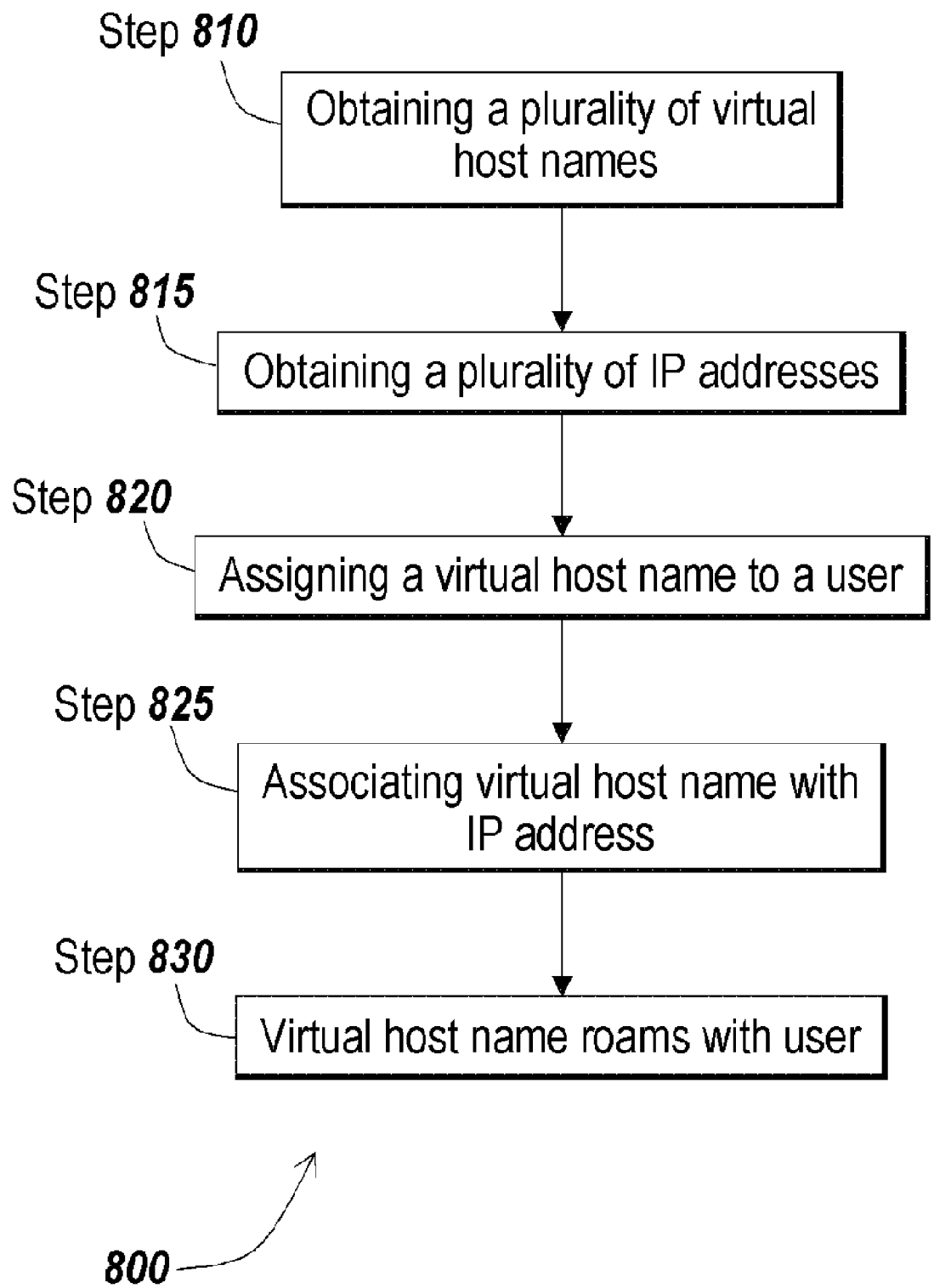
FIG. 8 is a flow diagram of steps performed in an embodiment of FIG. 7.

In another aspect, the present invention relates to methods for providing a uniform addressing scheme for a user independent from the client 108a-108n from which the user connects to the network 104. FIG. 8 depicts a flow diagram of the steps of a method 800 for practicing the present invention as shown in FIG. 7. The method 800 comprises the steps of obtaining a plurality of virtual host names (step 810), obtaining a plurality of internet protocol addresses (step 815), assigning a virtual host name to a user (step 820), associating a virtual host name with an IP address (step 825) and providing a virtual host name as the user roams the network (step 830). This method 800 can be repeated for each user or optionally, at any of the steps of method 800, the step can be performed for multiple users.

At step 810, a plurality of virtual host names 730 is obtained to be assigned to one or more users on the network 104. One or more of these virtual host names 730 may be registered in a DHCP server 334 or a name resolution service 710. In other embodiments, one or more of these virtual host names are defined in a storage location, on a client 108a-108n or a server 110, such a file or a database. In another embodiment, one or more of the virtual host names 730 are dynamically created by a virtual host name generator 750. A virtual host name may be obtained one at a time on an as needed basis per user or may be obtained in batches in a frequency as desired or needed to provide a virtual host name to each user or user session. At step 815, the method 800 provides for also obtaining a plurality of IP addresses. The IP addresses may be obtained via a DHCP server 334 or by the interface mechanism 320 of the network interface 708a-708n or by any other means discussed in relation to FIGS. 3A-3C and FIG. 4. The method 800 will assign IP addresses to virtual host names and associate the virtual host name with a user or a user session.

At step 820, the method 800 assigns a virtual host name or virtual host names to each user accessing the network via one or more of the clients 108a-108n. A first user accesses the network 104 via client 108a and establishes a user session on server 110. The method assigns the user a virtual host name from the plurality of virtual host names 730 for the users session on the server 110. The virtual host name assigned may be dedicated to the user and may include the name of the user. The same user may also access the network 104 and the server 110 concurrently from a second client 108b while the user is accessing the network 104 and the server 110 from the client 108a. A virtual host name will be assigned to the user for this second session from client 108b. This second virtual host name may be similar but will need to be different from the virtual host name assigned for the first user session via client 108a. For example, the virtual host name for these two sessions of the user may comprise the users login name with a suffix identifying the session, such as a session number.

A second user may access the network 104 via client 108b and establish a user session on server 110. Method 800 allows this second user or any other subsequent or concurrent user on the network 104 or the server 110 to be assigned a virtual host name to uniquely identify the user and/or the user session. The virtual host name will distinguish this user and/or user session from any other user or user session that may be concurrently executing or had previously executed. Step 820 assigns the second user a virtual host name different from the virtual host name of the first user, such as a virtual host name based from the users unique network user id. Step 820 may also the second user a virtual host name uniquely identifying the user and the user's session. In another embodiment, the virtual host name may be descriptive of the user, the client 108a-108n or the server 110 the user is accessing or the sub network of the network 104 from which the user is communicating.

At step 825, the method 800 associates the virtual host name of each user or user session with an IP address assigned to each user or each user session. Not only can the virtual host names be dynamically assigned to each user or user session as discussed above but also each IP address for each user or user session can also be dynamically assigned as discussed in regards to FIGS. 3A-3C. Each virtual host name assigned to a user or a user session will need to be associated with an IP address in order to resolve the virtual host name into an IP address for network communications such as socket based communications as described in FIGS. 3A-3C. The virtual host name can be resolved to an IP address via a name resolution service 710 on the network 104. After obtaining each of the IP address and virtual host name for a particular user or user session, the IP address to virtual host name mapping may need to be updated in the records of the DHCP server 334 and/or the name resolution service 710. In other cases, the virtual host name and/or IP address may have been previously registered with the DHCP server 334 and/or name resolution service.

At step 830, the virtual host name addressing scheme of steps 810, 815, 820 and 825 are performed as a user roams from one client 108a-108n to another client 108a-108n in a network 104, or a user starts up multiple users session on a client 108a-108n or a server 110, such as multi-user server 110'. Each time a user starts a program 340a-340n, such as a user session, on any client 108a-108n or server 110, the user may obtain an IP address as described in conjunction with FIGS. 3A and 3B and corresponding methods of FIG. 4, and a virtual host name as described in conjunction with FIG. 7 and the steps of method 800 described above. As such, the virtual host name roaming feature of the present invention allows efficient use of the virtual host name and/or virtual IP address to easily identify users, which can be used as a means for providing security or monitoring user activity or to provide location services to find users, and to satisfy application and systems that use the host name or IP address to identify a user.

Although the illustrative systems and methods of the present invention are generally discussed in terms of a TCP/IP network, the systems and methods can also be applied to other types of networks, such as IPX or DECNET. One ordinarily skilled in the art will appreciate the application of the systems and methods of the present invention to networks other than a TCP/IP based network. As such, the present invention can provide unique network identifiers for programs, users or user sessions running on any type of network applying the techniques and mechanisms described herein. Additionally, the present invention can also provide unique loopback identifiers for inter-process communications using any similar loopback type interfaces supported by the particular network. Furthermore, the present invention can provide for a uniform network addressing schemes for users on these other network types.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed as new and desired to be protected by Letters Patent of the United States is:

1. A method for providing a uniform network address, for a user accessing a computer on a network, independent of the computer the user is accessing, the method comprising:
   (a) obtaining, by an interface mechanism executing on a first computer having a computer host name and a computer internet protocol address to connect to a network, a plurality of virtual host names, each of the plurality of virtual host names comprising a host name uniquely identifying a user session from a plurality of user sessions hosted on the first computer;
   (b) obtaining, by the interface mechanism executing on the first computer, a plurality of internet protocol addresses, wherein none of the internet protocol addresses are previously reserved for a particular user;
   (c) assigning, by the interface mechanism executing on the first computer and from the plurality of virtual host names, a first virtual host name to a first user session for a first user accessing the network via the first computer;
   (d) assigning, by the interface mechanism executing on the first computer and from the plurality of internet protocol addresses, a first internet protocol address to the first user session;
   (e) assigning, by the interface mechanism executing on the first computer and from the plurality of virtual host names, a second virtual host name, different from the first virtual host name, to a second user session for a second user accessing the network via the first computer;
   (f) assigning, by the interface mechanism executing on the first computer and from the plurality of internet protocol addresses, a second internet protocol address different from the first internet protocol address, to the second user session;
   (g) accessing, by the first user session, the network using the first virtual host name with the first internet protocol address;
   (h) accessing, by the second user session, the network using the second virtual host name with the second internet protocol address;
   (i) assigning, by the interface mechanism executing on a second computer and from the plurality of virtual host names, the first virtual host name to a third user session for the first user accessing the network via the second computer;
   (j) assigning, by the interface mechanism executing on the second computer, a third internet protocol address to the third user session; and
   (k) accessing, by the third user session, the network using the first virtual host name with the third internet protocol address.

2. The method of claim 1, further comprising obtaining at least one of the plurality of internet protocol addresses from a Dynamic Host Configuration Protocol server.

3. The method of claim 1, further comprising reserving at least one of the obtained plurality of internet protocol addresses for at least one of the first user session and the second user session.

4. The method of claim 1, further comprising associating the first internet protocol address with the first virtual host name.

5. The method of claim 1, further comprising associating the second internet protocol address with the second virtual host name.

6. The method of claim 1, wherein step (a) further comprises registering, with a name resolution service, at least one of the plurality of virtual host names to one of either the first user session and the second user session.

7. The method of claim 6, wherein the name resolution service comprises one of a Domain Name Service and a Windows Internet Naming Service.

8. The method of claim 6, wherein the virtual host name identifies a program used by the user.

9. The method of claim 1, further comprising assigning, while the second user accesses the first computer, a fourth virtual host name and a fourth internet protocol address to the second user session accessing a second computer.

10. The method of claim 1, wherein step (a) further comprises naming at least one of the plurality of virtual host names with a portion of the characters representing the user's identity on the network.

11. The method of claim 1, wherein step (a) further comprises naming at least one of the plurality of virtual host names with a suffix identifying the session of the user when the user is concurrently accessing multiple computers on the network.

12. A system for providing a uniform network address, for a user accessing a computer on a network, independent of the computer the user is accessing, the system comprising:
- a server on a network, the server providing a plurality of virtual host names, each of the plurality of virtual host names comprising a host name uniquely identifying a user session from a plurality of user sessions;
- a first computer having a computer host name and a computer internet protocol address to connect to a network;
- an interface mechanism executing on the first computer to:
    obtain a plurality of virtual host names,
    obtain a plurality of internet protocol addresses, wherein none of the internet protocol addresses are previously reserved for a particular user,
    assign, from the plurality of virtual host names, a first virtual host name to a first user session for a first user accessing the network via the first computer,
    assign from the plurality of internet protocol addresses, a first internet protocol address to the first user session,
    assign, from the plurality of virtual host names, a second virtual host name different from first virtual host name, to a second user session for a second user accessing the network via the first computer,
    assign from the plurality of internet protocol addresses, a second internet protocol address different from the first internet protocol address, to the second user session;
- the first user session accessing the network using the first virtual host name with the first internet protocol address;
- the second user session accessing the network using the second virtual host name with the second internet protocol address;
- an interface mechanism executing on a second computer to:
    assign the first virtual host name to a third user session for a first user accessing the network via the second computer, and
    assign a third internet protocol address to the third user session; and
- the third user session accessing the network using the first virtual host name with the third internet protocol address.

13. The system of claim 12, wherein the server obtains at least one of the plurality of internet protocol addresses from a Dynamic Host Configuration Protocol server.

14. The system of claim 12, wherein the server reserves at least one of the obtained plurality of internet protocol addresses for one of either the first user and the second user.

15. The system of claim 14, wherein the network interface associates the at least one reserved internet protocol address with at least one of the first virtual host name and the second virtual host name.

16. The system of claim 12, wherein the system further comprises a name resolution service to register at least one of the plurality of virtual host names.

17. The system of claim 16, wherein the name resolution service further comprises one of a Domain Name Service and a Windows Internet Naming Service.

18. The system of claim 12, wherein the name of at least one of the plurality of virtual host names comprises a portion of the characters representing the user's identity on the network.

19. The system of claim 12, wherein the name of the least one of the plurality of virtual host names comprises a suffix identifying the session of the user when the user is concurrently accessing multiple computers on the network.

* * * * *